United States Patent [19]

Thomas et al.

[11] 4,424,589
[45] Jan. 3, 1984

[54] FLAT BED SCANNER SYSTEM AND METHOD

[75] Inventors: E. Raymond Thomas; Lysle D. Cahill, both of Dayton; William W. Marshall, Xenia; Luke L. Talley, Centerville; John A. Lawson, Dayton; Brian N. Wilcox, Kettering, all of Ohio

[73] Assignee: Coulter Systems Corporation, Bedford, Mass.

[21] Appl. No.: 139,463

[22] Filed: Apr. 11, 1980

[51] Int. Cl.³ .......................... G06K 9/20; H04N 1/10
[52] U.S. Cl. ...................................... 382/61; 350/6.6; 350/6.91; 358/208; 358/285; 358/293; 382/66
[58] Field of Search ................ 340/146.3 F; 358/285, 358/287, 293, 206, 208; 350/6.1, 6.2, 6.5, 6.6, 6.91; 346/108; 315/370, 371; 382/65–68, 61

[56] References Cited

U.S. PATENT DOCUMENTS

| | | | |
|---|---|---|---|
| 3,687,025 | 8/1972 | Rosin | 350/6.91 |
| 3,719,780 | 3/1973 | Gazard et al. | 350/6.91 |
| 3,800,080 | 3/1974 | Fuwa | 358/293 |
| 4,003,626 | 1/1977 | Reinke et al. | 350/6.91 |
| 4,032,888 | 6/1977 | Broyles et al. | 358/208 |
| 4,099,092 | 7/1978 | Bristow | 315/370 |
| 4,217,611 | 8/1980 | Ogawa | 358/285 |
| 4,256,959 | 3/1981 | Monette | 358/285 |
| 4,268,870 | 5/1981 | Kitamura et al. | 358/285 |
| 4,280,145 | 7/1981 | Norrell | 358/285 |
| 4,298,944 | 11/1981 | Stoub et al. | 315/370 |
| 4,302,681 | 11/1981 | Woodsford et al. | 358/285 |
| 4,314,154 | 2/1982 | Minoura et al. | 350/6.6 |

Primary Examiner—Boudreau Leo H.
Attorney, Agent, or Firm—Silverman, Cass & Singer, Ltd.

[57] ABSTRACT

A flat bed scanner system for optically sensing a transparent original image and producing three channels of binary digital data representing the densities of the original image. Each channel produces data in response to one sensing color and sensing of the original image occurs by directing a focused image of a beam of white light onto and across the original image in a pattern of parallel scan lines there being a plurality of sensing positions along each scan line, and producing the digital output data in response to the modulated beam of light transmitted by the original image. There is an optical system which provides for the directing of the beam of white light across the original image and which directs the modulated beam onto sensors. The optical system includes color correction and field flattening of the beam of white light and provides a cylinder condenser lens for the modulated beam of white light. An electronic system receives signals from the sensors and converts them into the desired digital data through analog to digital and logarithmic conversion circuits, base line correction circuits and references compensation circuits. The electronic system also provides a sample clock signal synchronizing the locations of the sensing beam with the locations of the sample positions by way of an optical grating system. An electromechanical system is provided to maintain the optical system in focus from scan line to scan line on both the original image and the optical grating system.

17 Claims, 18 Drawing Figures

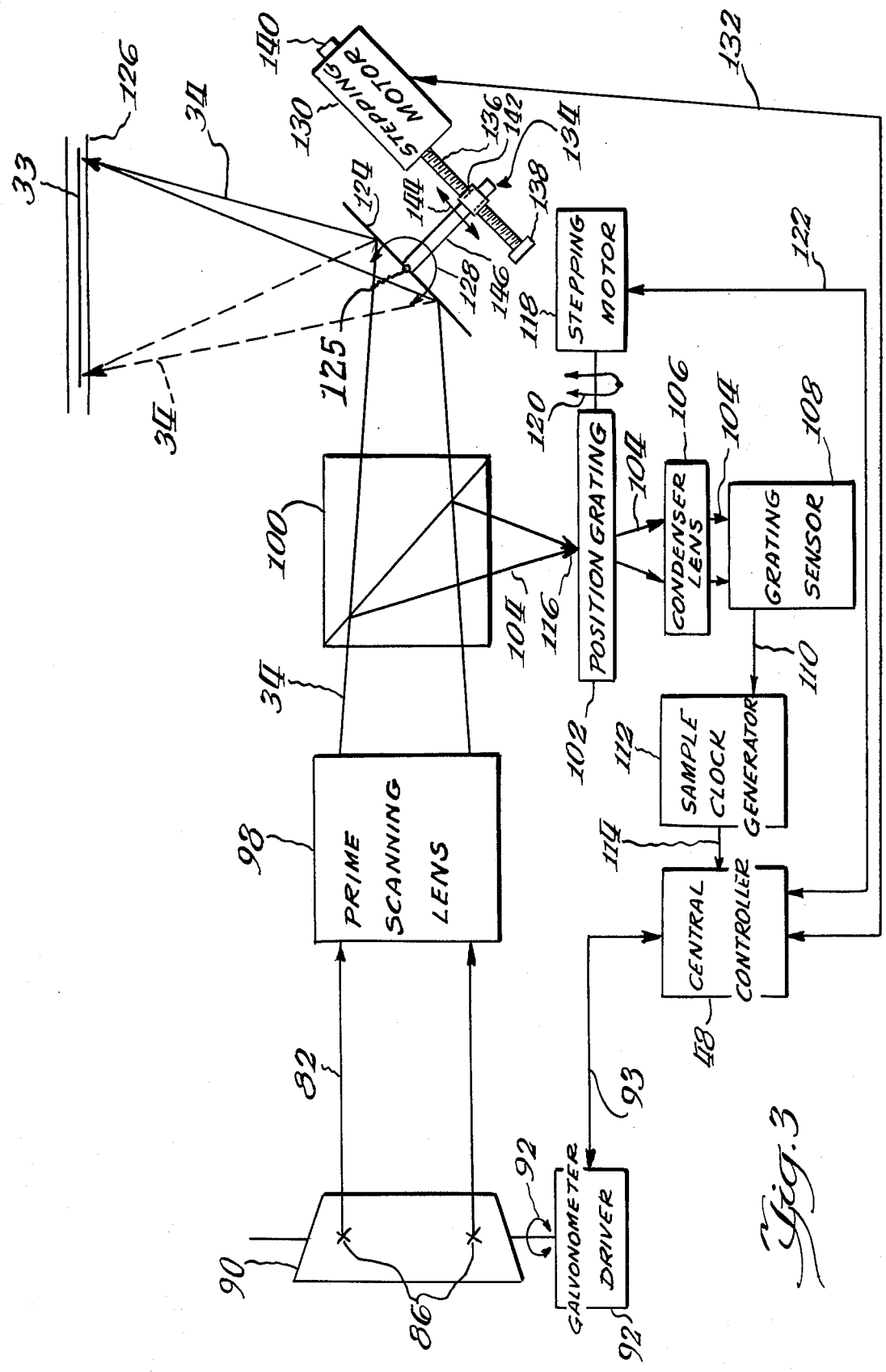

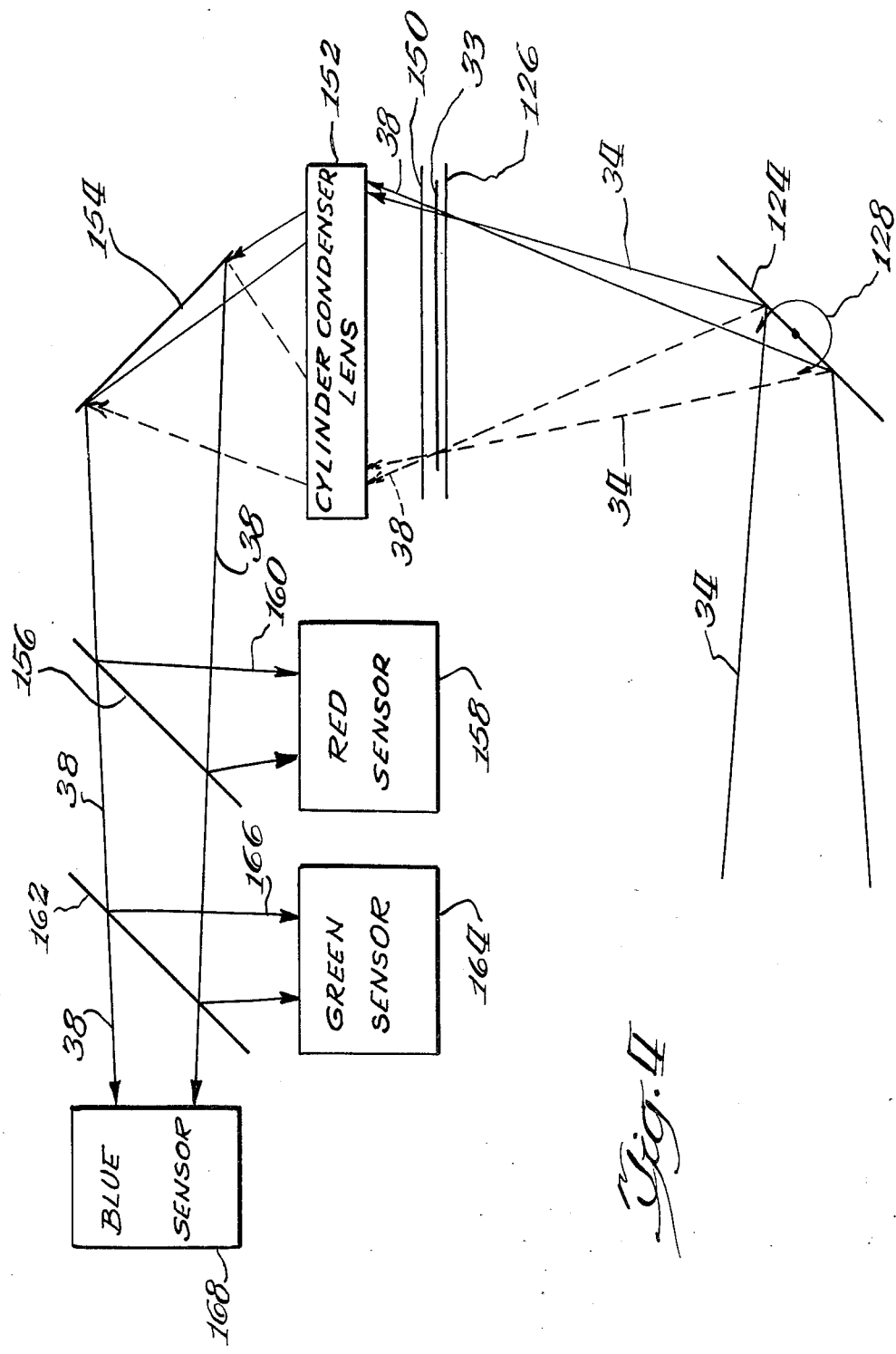

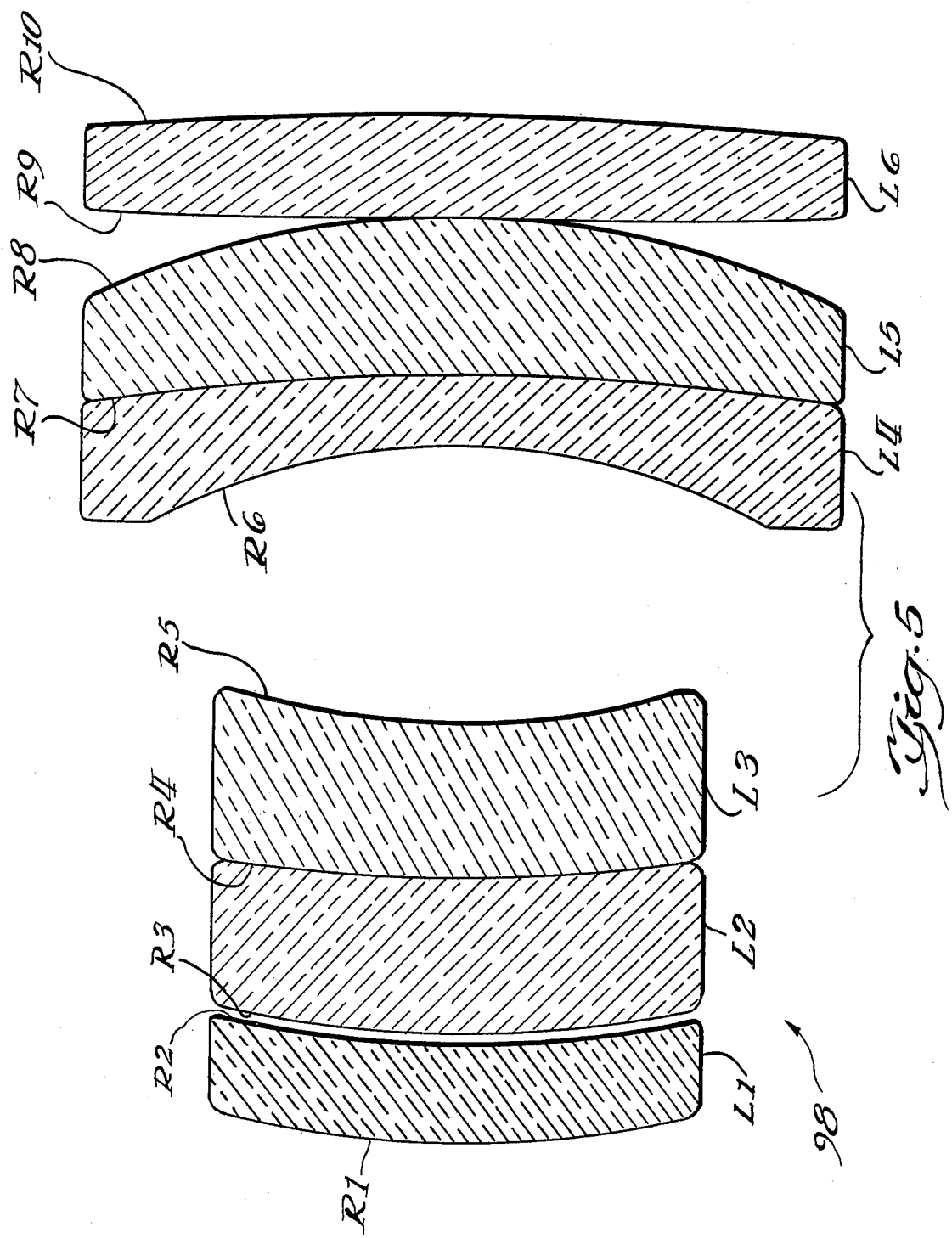

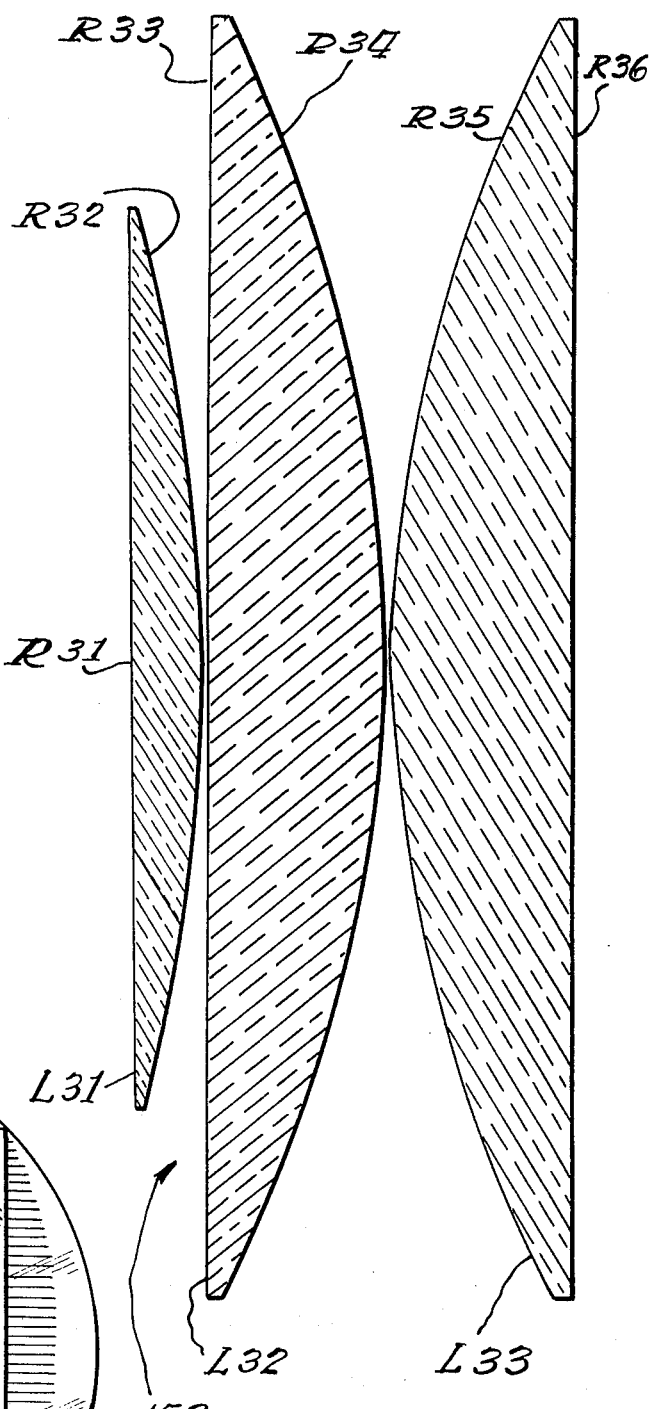
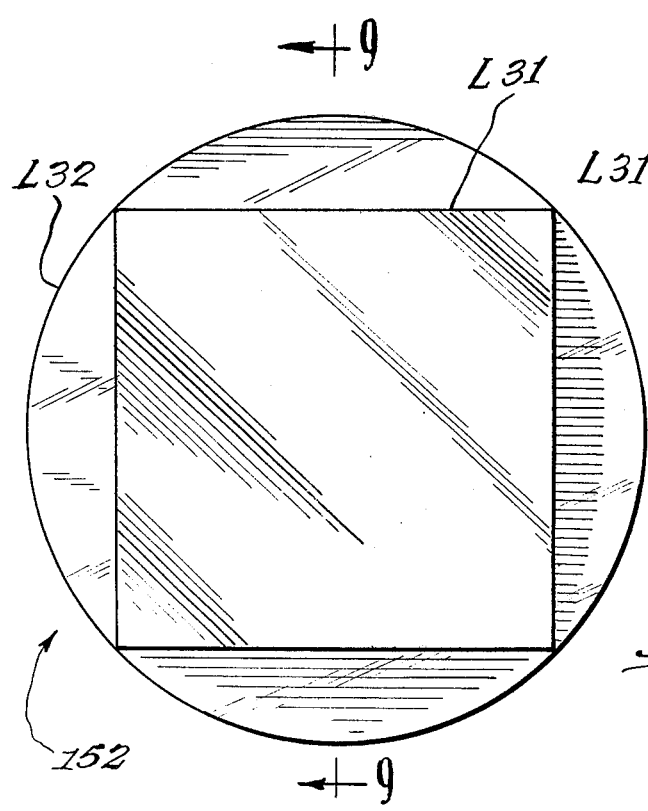

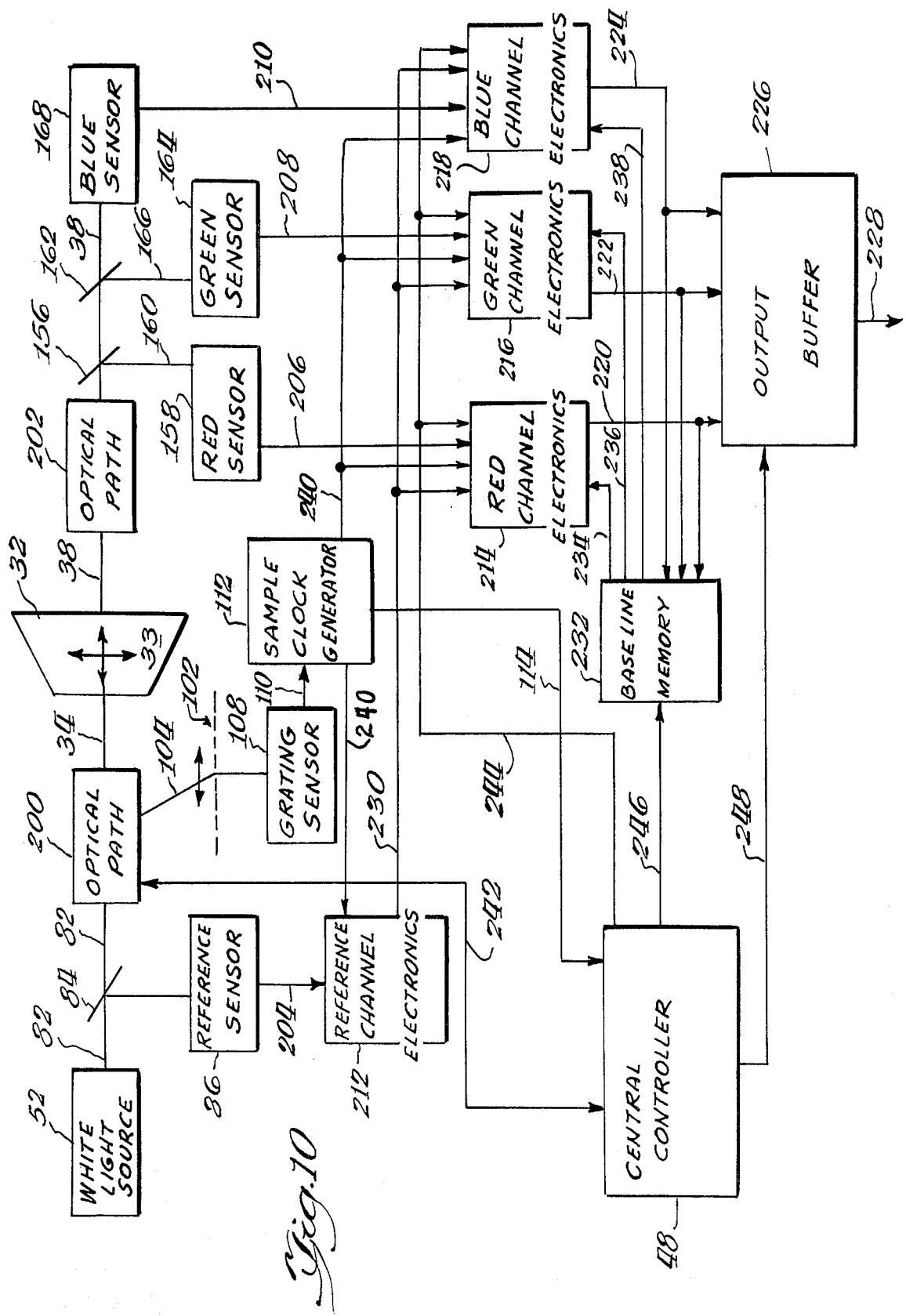

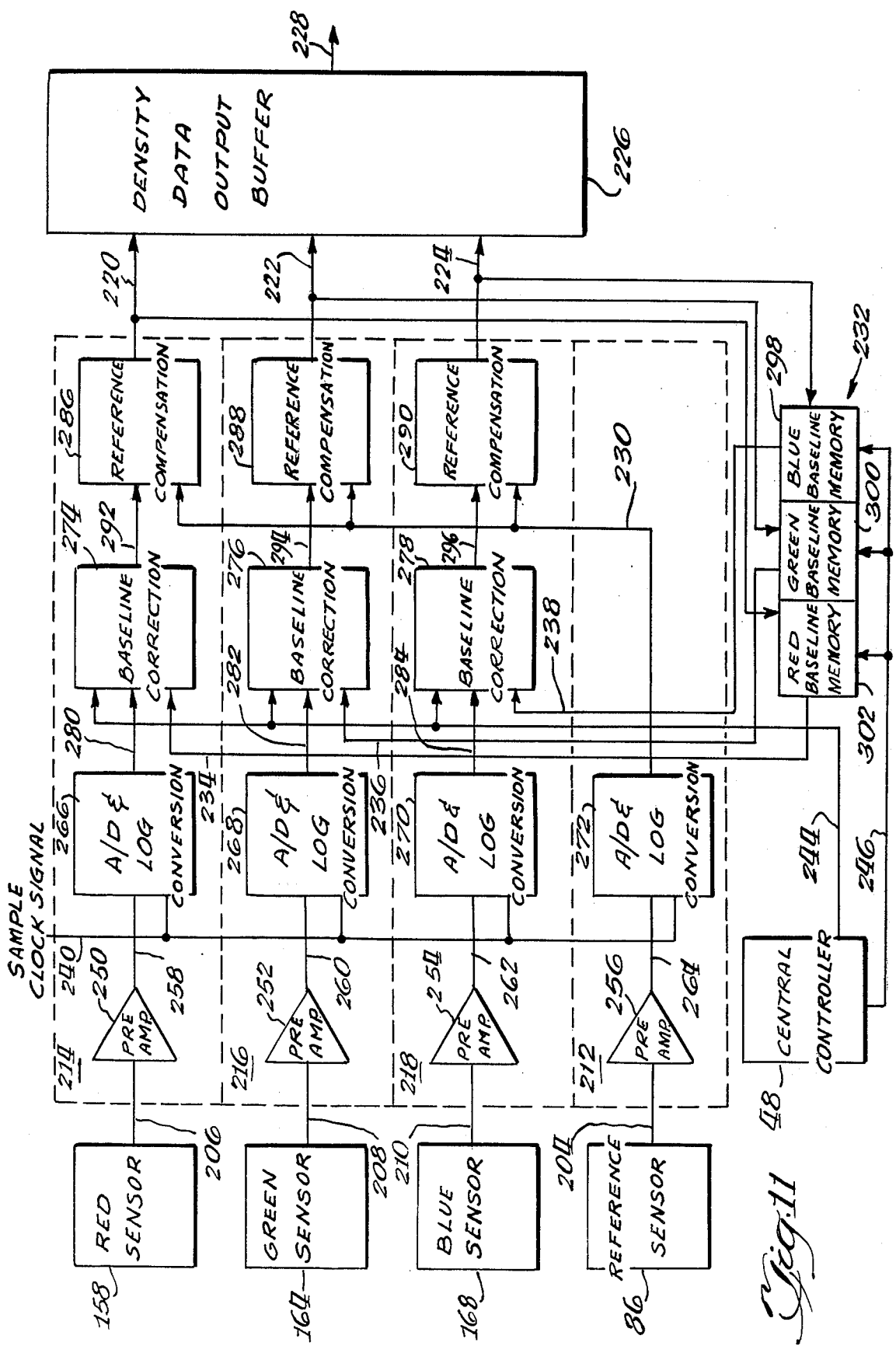

FLAT BED SCANNER SYSTEM AND METHOD

FIELD AND BACKGROUND OF THE INVENTION

The field of the invention comprises apparatus and method for optically scanning planar original images and producing therefrom binary digital data representing the original images. In particular, the field of the invention comprises apparatus and methods for optically scanning planar, transparent original images and outputting three channels of data representing the densities of the original image, with each channel representing the densities of the original image sensed at one wavelength of radiant energy. The output digital data thereafter is used in electronic computation systems to provide printing plates for use in offset lithographic printing presses with the data ouput by the invention primarily being used to provide graphics information.

In the printing industry graphics information such as pictures, photographs and other images have been reproduced on printing plates by use of photographic methods using the half-tone process. These photographic methods require that an original image be photographed through screens of parallel and perpendicular lines to produce on photographic plates dot arrays representing the intensities of incremental areas of the original image. The photographic plates then are manually developed and processed to form on the printing plates corresponding arrays of dots representing the original image.

To reproduce a color original image, the original image is photographed several times through different color filters to form color separations where every separation is formed of an array of dots representing the intensities of the original image at the wavelength or wavelengths corresponding to the color filters. These color separations then are individually transferred to printing plates for use in a lithographic offset press where each plate is used to print a different color on a receptor and the images provided by the plates are overlayed on one another on the receptor to reproduce the color original image.

The process of making plates using the same techniques as have conventionally been used, that is making the color separations and deriving the metal printing plates therefrom has been effected in recent times electronically. Optical scanners are used to sense the intensities of incremental areas of a continuous tone original image and in response thereto produce digital data representing the various densities of the incremental areas or so-called picture elements of the graphic original image. This digital data then is used to reproduce the image as an array of dots on a printing plate with heat or light sensitive systems.

These optical scanners generally are of two types which correspond to the two types of graphic images available. The first type are reflective scanners for use with original images such as prints which depend upon light being reflected from them to form the desired image. The other type are transmissive scanners which sense the density of graphic images formed by light passing through them such as slides and movie film.

One of the problems associated with optical scanners sensing transparent images is that they scan the original image with one color or one wavelength of radiant energy at a time. To reproduce a color original image then, the original image must be scanned once for each color separation desired.

Optical scanners are known which sense an original image with more than one wavelength of radiant energy or color at one time, but a problem arises in maintaining equal the sizes of the incremental areas sensed by the different colors. It is well known in optics that in a range of wavelengths, a primary color of a beam of white light may be focused precisely on a desired plane, while other colors or wavelengths of that same beam of light will be focused at distances other than at the desired plane, this phenomenon being referred to generally as chromatization. Thus in a color scanner, while a primary color senses the desired incremental area of the original image, the remaining colors sense incremental areas having sizes greater than the desired incremental area, which degrades the quality of the output data.

The present invention corrects for this chromatization by providing a combination of a reflective lens system and a refractive lens system, the secondary color abberrations introduced by each lens system cancelling each other and providing the desired focusing of the different sensing colors of a beam of white light precisely on or in the plane of the original image. Thus the sizes of the incremental areas scanned by each scanning color are maintained equal and the quality of the output data representing the intensities of the original at each incremental area is greatly improved.

Another problem encountered by known optical scanning systems is that of maintaining the focused sensing image in the plane of the original image across scan lines of a scanning pattern performed across the original image. The invention hereinsolves this problem by providing a prime scanning lens system which maintains the focused image in the plane of the original image across every scan line.

Another problem encountered in flat bed optical scanning systems is directing the modulated beam transmitted by the original image onto sensors which sense the intensity of the transmitted beam of white light. In scanning systems where there is a raster mirror which deflects the beam from scan line to scan line across the original image and the raster mirror is closer to the original image than a fast scanning mirror which deflects the beam of light across individual scan lines, the exit pupil location generated by the raster mirror is closer to the imaging plane than the exit pupil location generated by the fast scanning mirror. To provide for this difference in location of exit pupils, a cylinder condenser lens system is provided between the original image and the sensors.

Flat bed scanner systems generally include electronic systems which receive analog electrical signals from the sensors having amplitude corresponding to the intensities of the modulated beam of light from the original image and output digital binary data indicating the densities of the scanned area of the original image. The modulated beam of light from the original image thus represents the transmission characteristics of the original image and the formula for converting the transmission characteristics of an image to density is well-known as follows:

$$D = \log 1/T$$

Thus to provide a conversion from the transmission characteristic of the original image carried by the modulated beam of light to digital data representing the density of the original image, a logarithmic conversion must be made on the analog signals from the sensors.

The flat bed scanner system herein performs this conversion over a dynamic range of 30,000 to 1 of light intensity levels, corresponding to a logarithm of intensity-dynamic range of 4.49 to 0.00 with an accuracy of at least ±0.01 of the logarithm of the intensity, and without drift due to the temperature or errors due to noise of more than ±0.01 of the log values.

Prior systems performing this conversion have taken one of two approaches, using either an analog method of logging which depends on the voltage versus current characteristics of a foward biased semiconductor junction, or a digital method using an analog to digital converter and a memory look up table containing the logarithmic values.

The analog method of logging has as its drawbacks that it is only a rough approximation of the actual logarithm; that it has a large thermal drift error and is relatively noisy which precludes its use in systems requiring a wide dynamic range of greater than 100 to 1 in intensity levels, and/or in systems where total energy available at the low end of the intensity levels is very small resulting in poor signal to noise ratios. The advantages of this method however, are lower costs and circuit simplicity.

The drawbacks of the digital method are that for a high resolution and wide dynamic range, the required number of bits required to provide the desired accuracy and resolution of the analog to digital converter go up exponentially. For example, for an end result of dynamic range of 1000 to 1 (0.00D to 3.00D) with a 0.01D accuracy and resolution, the required number of bits output from the analog to digital converter is 16. If allowance is made for light compensations and other error correcting concepts, the number of required bits can be between 17-20 for an 8-bit representation of the output data. Also, log look up tables with 16-20 address lines will contain an unnecessarily large amount of look up values or positions within the memory device, these being between $2^{16} = 65,536$ and $2^{20} = 1,048,576$. 16 bit analog to digital converters presently available on the market have conversion times in the order of milliseconds rather than the several microsecond conversion speed required per sample by the present scanner system. Analog to digital converters with greater than 16-bit resolution are not available at any speed.

Digital conversion however, has the advantages however of being noise-free, free of thermal drift problems and capable of accurate log transformation.

The logarithmic conversion scheme chosen for the scanner system herein is a new variation of the digital method. The present invention operates on the analog electrical signals from the sensors in three amplitude bands to eliminate or reduce the wasted resolution capabilities of the analog to digital converters and memory look up tables at high intensity levels which occur due to the non-linear relationship between inputs and outputs of the log conversion circuits.

For example, consider an analog electrical signal voltage range being from 10 volts to 0.01 volts. A high band operates on input signals between 10 volts and 1 volt (10 volts representing the brightest modulated light from the original image), the middle range operates on input signals between 1 volt and 0.1 volts, and the low band operates on signals between 0.1 volt and 0.01 volt. An input signal of six volts (a fairly bright intensity level or little modulation), will be operated on by only the high band. Operation of the other two bands will be disabled through the selective gating. In a similar manner, a signal occurring within the voltage range of the low band, such as 0.03 volts will be operated on only by the low band and will disable operation of the middle band and the high band.

This method causes the resolution capability of the system to be varied from adequate resolution at the lowest point of each band to approximately 30 times greater resolution than required at the high end of each band. This concept while still somewhat wasteful requires only three 10-bit analog to digital converters and three $1K \times 8$ memory devices to cover a 30,000 to 1 dynamic range of light levels. This is opposed to non-band digital logging systems which require a 20 bit analog to digital converter and a $1M \times 8$ memory device and which also provide a 10,000 greater resolution than required at the high end of the intensity levels.

Correction for losses in the intensities of the beam of light occurring in the optical system across each line of the scanning pattern is provided for during the log conversion process as is compensation for variations in fluctuations in the intensity of light source during a scanning cycle and from scanning cycle to scanning cycle.

As has been stated, the original image is scanned by deflecting a beam of white light across the original image in a pattern of scan lines. The pattern comprises a plurality of parallel scan lines with a plurality of sample positions in each scan line. Each of the output data represents the intensity of a single sample position of the original image, requiring that a sample clock signal be provided which indicates the alignment of the scanning beam with a sample position on the original image and the sampling of data from the modulated beam.

The sample positions are located in a generally orthogonal pattern across the original image, the sample positions being spaced equidistant from each other along a scan line and the scan lines being spaced equidistant from each other. To maintain the quality of the output data, it is desired that the sample clock signal be subject to errors of less than $\pm \frac{1}{4}$ of a sample position interval, induced by noise, thermal drifts or mechanical inaccuracies of any kind.

The prior art has used two methods of forming such sample clock signals. The first is by accurately controlling the position of the sensing beam as it passes across a scan line by way of an extremely precise galvanometer control, the galvanometer mirror of such systems providing the fast sweep of each scan line. This accurate control method requires either highly calibrated and thermally compensated galvanometers or accurate noise free feed-back techniques or both. Even with such apparatus, positional accuracy of $\pm \frac{1}{4}$ of a sample position is difficult to obtain.

The other method is accurately determining the position of the sensing beam by accurately determining the position of a reference beam which is deflected equally with a sensing beam, the reference beam being deflected over an optical reference. Such an optical reference is a line grating in which there are alternating pairs of opaque and transparent lines or areas on a transparent substrate. The limitations for this type of system include however, that for very close sample position spacing such as a 10 micron spacing used by the present system, a 10-micron line pair grating is required which is expensive; that a 10-micron light spot moving across a grating with 10 micron line pairs does not generate a well-defined electrical pulse having a high signal to noise ratio, especially if the spot is not maintained precisely in focus on the grating; and that a dust particle of three (3) microns or more can cause erroneous sample clock generation or a lack of sample clock generation, both of which may degrade the quality of the output data to an extent that the output data's worthless.

The present invention accurately determines the position of the scanning beam over the original image by simultaneously scanning a reference grating with a reference beam split from the sensing beam thereby both beams being deflected equally, and using pulses derived from the reference grating for the sample pulse clock generation. This provides the following improvements. A grating line pair of four times greater width than the spot size is chosen for a ten (10) micron spot size, or a 40 micron line pair. This has the advantage of being a less expensive grating and providing a well-defined pulse with high signal to noise ratio and a less critical spot focus on the grating. An electronic technique then is used for insertion of the sample clock signals between the grating pulses which provides immunity from erroneous clock signal generation and a lack of sample clock signal generation.

This electronic technique inserts sample clock signals with a better than $\pm\frac{1}{4}$ sample position accuracy and provides sample clock signals at a rate which is 4 times faster than the occurrence of the grating pulses. Sample clock signals are always evenly spaced between grating pulses because the inertia of the fast scanning or galvanometer mirror across the scan line provides a very small speed change from one grating pulse to the next.

An electromechanical system of the flat bed scanner system operates in conjunction with the optical system to provide non-linear movement of optical elements to maintain the required focusing of the optical system.

The optical system of the flat bed scanner system is designed to produce a focused image anywhere in the image area or across the scanning pattern on the original image. The scanning of each scan line is produced by movement of a galvanometer mirror while step-over or stepping between scan lines is produced by movement of a raster mirror.

As has been stated, the distances between scan lines are equal across the scanning pattern. In the present system, the longitudinal axis of the raster mirror is parallel to and is spaced perpendicular from the scan line occurring at the center of the original image.

Using geometry and taking into account optical distortions present at the imaging plane, one may determine that the angular change between scan lines occurring at the center of the original image are different than the angular changes between the scan lines occurring at the edges of the original image, i.e. the equation determining the angular change of the raster mirror from scan line to scan line is non-linear and cannot be determined except by numerical methods. Thus to provide stepping between scan lines, a complex calculation would have to be performed which may take more time than is available.

The present invention solves this problem by providing a memory look up table containing the predetermined values by which the raster mirror must be rotated to provide the desired stepping between scan lines. Providing this look up table obviates the need to calculate the number of step pulses required to be applied to the stepping motor to rotate the raster mirror during the time between the scanning of each scan line.

As the raster mirror steps the beam from one scan line to the next, the distance from the raster mirror to the scan line changes. One problem generated by the changing distance between the raster mirror and the image plane is that the focused image occurs off the image plane (or the image of the pinhole is defocused on the image plane) as the beam is stepped from the center to the edge of the original image.

The present invention compensates for this movement of the focused image from the image plane which would otherwise occur by moving the pinhole forming the object of the focused image along the optical path as a function of the position of the scan lines from the center of the original image. The implementation of this invention is similar to that for the scan line step compensation in that a stepping motor is provided which moves the pinhole object in linear steps along the optical path in response to predetermined numbers stored in a look up memory table.

When the pinhole object is moved along the optical path, the optical grating also must be moved a like amount to maintain the focused image across the plane thereof so that the grating pulse generated therefrom will be strong and well-defined. This is compensated for by providing a stepping mirror to move the optical grating in incremental linear steps along the optical path in response to predetermined values stored in a memory.

Using these methods, the entire optical system may be maintained in focus with any desired changes occurring between the scanning of every line so that during the scanning of every line the only moving part of the flat bed scanner system is the galvanometer mirror.

SUMMARY OF THE INVENTION

A flat bed scanner system and method of scanning a planar transparent member carrying an original image with a beam of white light to produce digital data representing the densities of incremental areas of the original image.

The flat bed scanner system comprises an optical system which provides and directs a beam of white light onto the original image and which directs a modulated beam of white light transmitted by the original image and representing the transmission characteristics of the original image onto sensors which output analog electrical signals with amplitudes corresponding to the intensities of the modulated beam. An electronic system of the flat bed scanner system converts the amplitudes of the analog electrical signals from the sensors into corresponding digital data representing the densities of the original image. An electromechanical system is provided to maintain the optical system in focus.

The optical system includes a prime scanning lens system which maintains the beam of white light in focus across every scan line of a pattern of scan lines. Color correction is provided in the optical system by way of a reflective lens system and a refractive lens system to maintain a plurality of wavelengths of the white light in focus across every scan line, and a cylinder condenser lens system is provided which directs the modulated beam of light from the original image unto the sensors.

The electronics system performs an analog to digital and logarithmic conversion of the signals from the sensors, corrects for scanning pattern position sensitive losses in the intensities of the beams which may occur in the optical system or otherwise and compensates for fluctuations in the intensity of the beam from the source of white light. The analog to digital and logarithmic conversions of each of the three color sensing channels is performed in three bands of amplitude with respect to the amplitudes of the analog signals from the sensors. Base line correction for losses in the beam intensities which are position sensitive are performed by adding empirically determined values to the logarithmic converted values. Reference compensation for fluctuations in the intensity of the light source and the final step of converting the data from representing the transmission characteristics of the original image to representing the density characteristics of the original image are performed by subtracting the base line corrected values from logarithmic converted values representing the intensity of the light source.

Sampling of the original image at desired incremental areas or sample positions of the scanning pattern occurs in response to a sample clock signal generated in response to grating pulses produced by a reference beam of light which is deflected across a grating of alternating opaque and transparent lines or spaces, being transmitted through the transparent spaces to a grating sensor. The grating line frequency is an integer multiple of the sample position frequency with electronics being provided to insert the desired number of sample clock signals between pulses from the grating sensor.

The electromechanical system provides proper spacing between scan lines by moving the raster mirror through predetermined non-linear angular changes. The beam of light maintained is in focus in the plane of the original image from scan line to scan line by a stepping motor moving a pinhole object in linear steps along the optical path. Corresponding to the movement of the pinhole object along the optical path, the grating of alternating opaque and transparent spaces also is moved along the optical path to maintain the reference beam in focus thereon. Operation of the stepping motors occurs between scanning of scan lines so that during the scanning of a scan line, the only moving part of the flat bed scanner system is a galvanometer mirror which deflects the beam across every scan line.

The system provides output data in a greater operating range with a finer resolution than has previously been obtained in such a scanning system.

BRIEF DESCRIPTION OF THE DRAWINGS

FIG. 3 is a portion of the optical system and the electromechanical system of the apparatus that is constructed in accordance with the invention and uses the method of the invention;

FIG. 4 is a portion of the optical system and the electromechanical system of the apparatus that is constructed in accordance with the invention and uses the method of the invention;

FIG. 5 is a representation of elements of a prime scanning lens system constructed in accordance with the invention;

FIG. 8 is a plane view of elements of a cylinder condenser lens system embodying the invention;

FIG. 9 is a representation of elements of the cylinder condenser lens system illustrated in FIG. 8 taken generally along the line 9—9 of FIG. 8 and in the direction shown;

FIG. 10 is a schematic diagram illustrating the interconnections between the optical system and the electronic system of the apparatus described herein which is constructed in accordance of the invention and uses the method of the invention;

FIG. 11 is a more detailed block diagram of the reference channel and color channel electronics illustrated in FIG. 10;

DESCRIPTION OF THE PREFERRED EMBODIMENT

In the preferred embodiment, flat bed scanner system receives a transparent member carrying an original image and outputs binary digital data representing the densities of the original image. This data then may be readily processed by other systems using modern digital methods and primarily is used to reproduce the original image on an electrophotoconductive member thereafter used as a printing plate in a lithographic printing press.

The information input to the flat bed scanner system must be in the form of a transparent member carrying the original image, i.e. transparent member must be capable of allowing light to pass therethrough. In the preferred embodiment the transparent member may be such as 35 millimeter and 70 millimeter slides or strip films and the transparent member also may be such as film having a five inch by five inch format. The transparent member may contain any type of original image desired including a continuous tone graphic image and text, and further may be in either color or black and white.

The flat bed scanner system may best be understood by considering that a focused beam of white light is directed on the transparent member and as it passes therethrough is modulated by the density of the original image with the light transmitted or passing therethrough representing the transmission characteristic of the original image. The modulated beam of white light then is passed to sensors which convert the intensity of the optical beam to electrical signals. The electrical signals which represent the transmission characteristic of the original image then are operated on to provide output data representing the density values of the original image.

Figure 1:
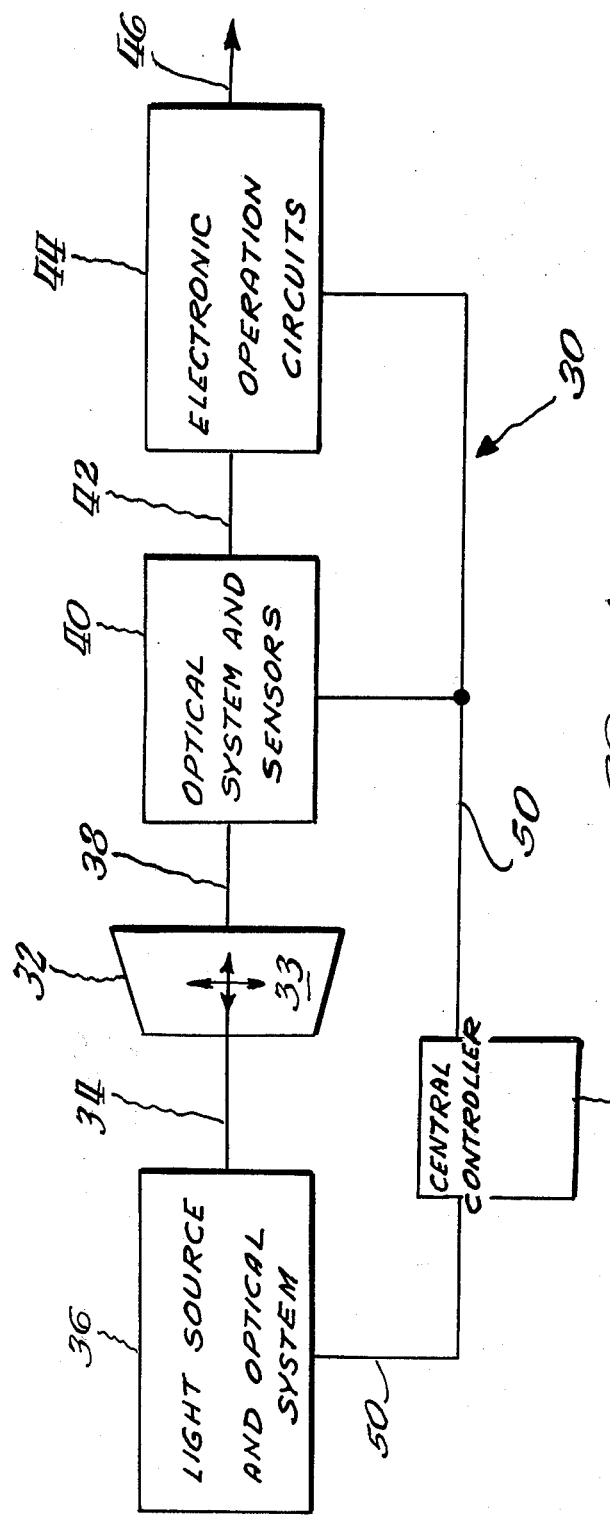
FIG. 1 is a block diagram of an apparatus for producing binary digital data representing an original image that is constructed in accordance with the invention and uses the method of the invention.

This is illustrated in FIG. 1 where the flat bed scanner system is illustrated generally by the reference character 30. The transparent member 32 carrying the original image 33 has a beam 34 of white light directed on it from a light source and optical system 36. A modulated beam 38 of light which has passed through transparent member 32 and represents the transmission characteristic of the original image then passes to optical system and sensors 40 wherein the radiant energy of the modulated beam 38 is converted to electrical analog signals 42 having amplitudes directly related to the intensity of modulated beam 38 and the transmission characteristic of the original image. Analog signals 42 then are presented to electronic operation circuits 44 which operate on the analog signals to provide the desired output data 46 represented in units of density. System control is by way of central controller 48 to the optical systems and electronic circuits through leads 50.

For simplicity of explanation of the system in the preceding paragraphs, the system has been described as if only one color or one wavelength of the beam of white light is used to sense the desnity of the original image.

In the preferred embodiment, three colors or three different wavelengths of the beam of white light are used to sense the original image. The transmission characteristic of the original image carried by each color or wavelength of the beam is treated individually through the sensors 40 and electronic circuits 44 to provide three independent channels of output data each representing the density sensed by that color of light passing through the original image. Through these three channels of output data, the original image thereafter may be reconstructed in a suitable imaging device while retaining the color characteristics of the original image.

Each color channel presents data words representing the density of successive scanning positions of the original image in the form of binary digital words each having eight parallel bits. With eight bits of information per word, each word may be used to represent a 256 step scale of density which also may be referred to as a gray scale. Thus each digital word may represent one of 256 steps of density of the original image.

The output data of each channel represent the density (D) of the original image in a dynamic range of from 0.00D to 2.99D or in 300 units of density with each unit representing 0.01D. By dividing the 300 units of density by the 256 steps available in each output data word, it may be seen that each step of every output data word represents 0.01171875D. This provides incremental steps of density which are finer than have been obtained previously with other comparable scanning systems.

Modulation of the electrical analog signals 42 by the electronic operation circuits 44 is by way of a well known formula for converting optical transmission to density and is as follows:

$$D = \log 1/T$$

where:
D represents density; and
T represents transmission

In the preferred embodiment suitable constants are utilized in this basic formula to provide for physical constants of the flat bed scanning system. In addition to this transmission to density conversion, correction and compensations are made to the data in the electronic operation circuits 44 to correct for losses and fluctuations in the system.

Scanning of the original image 33 occurs by deflecting beam 34 across the original image 33 in a predetermined pattern comprising multiple parallel and straight scan lines, there being a plurality of sample positions in each scan line. Scanning in each scan line occurs rapidly and moving between the scan lines occurs at a slower rate. The sample positions are arranged in an orthogonal pattern across the surface of the original image and in the preferred embodiment, the spacings between the centers of the sample positions are 25 microns and 10 microns. The configuration of the sample area at each sample position approximates a circle centered around the sample position center and has a diameter approximately equal to the distance between sample position centers.

Beam 34 is focused on the original image 33 in all of the sample positions along one scan line to maintain the integrity of the sample positions sizes so that only the desired areas may modulate the beam 34. The beam 34 is maintained in focus along a scan line by a color corrected optical system and is maintained in focus from scan line to scan line by an electromechanical system both of which will be explained in more detail hereinafter.

Control of the flat bed scanner system is by way of central controller 48 with operator input being through a key board and operator feedback being through a CRT display. In operation the operator enters the desired system parameters such as the size of the original image to be scanned, the distance between sample positions, etc. The operator then manually inserts the transparent member 32 in a tray of the scanner which has been extended out from the scanner cabinet by way of a stepping motor under control of central controller 48. The transparent member 32 is inserted between two plates of glass in a position which is defined as the imaging plane. The tray then is retracted back into the scanner cabinet under control of the controller 48 and scanning of the original image commenses.

The transparent member 32 is fixed in the tray and does not move during scanning. Beam 34 is deflected along a scan line by a galvanometer driven mirror and from scan line to scan line by a stepping motor driven raster mirror. Between scan lines several other stepping motors may be operated to correct and compensate for desired changes in the optical path. During the movement of the beam across one scan line, however, there is only one moving part in the flat bed scanner system, that being the galvanometer driven mirror which moves the beam 34 across a scan line in a continuous manner as opposed to a stepped manner.

Determination of the individual sample positions in a scan line is made by splitting a part of beam 34 from the optical path shortly after the galvanometer mirror and applying the beam so split to a grating or optical scale system. The grating system includes a grating member carrying alternating and equally spaced transparent and opaque across the length of which the split beam is applied with the transmission of the split beam through the transparent regions of the grating member being sensed by a sensor and thereafter being converted into an electrical pulse by a sensor. The pulses from the sensor obtained as the split beam passes across transparent and opaque areas then are used to provide one sample clock signal for each desired sample position. Different gratings are provided for each of the desired sample positions spacings and they may be changed automatically under control of central controller 48. When a scanning cycle of the original image has been completed, the tray is again extended outwardly from the scanner cabinet for manual removal of the transparent member by the operator.

It has been stated that the beam 34 of white light is focused on the original image at the sample positions along the scan line. In actuality only the three desired wavelengths of the white light are in focus at the imaging plane where the original image is located. The other wavelengths of the beam 34 of white light are slightly out of focus relative to the imaging plane.

The focusing of the three desired wavelengths is provided for in a color corrected optical system comprising a reflective element known as Mangin mirror and a refractive element described hereinafter as a prime scanning lens system. This color corrected optical system focuses the three desired sensing colors from a spatial filter a pin hole object onto the original image in the imaging plane. Without this color correction, the three desired scanning colors would be focused to either one side or the other of the imaging plane which increases the area scanned by that particularly color and degrades the output data produced in response thereto. Essentially the reflective Mangin mirror and the refractive prime scanning lens system together cancel out the color aberrations they individually introduce into the optical path.

OPTICS

The optics for the flat bed scanner system comprise an optical path and lens systems. As has been stated hereinabove, the original image 33 is inserted into the optical path and modulates beam 34 to provide modulated beam 38. Thereafter the radiant energy remaining in modulated beam 38 is converted into electrical analog signals representing the transmission characteristic of original image 33. The lens systems are located in the optical path and are used to obtain desired results such as color correction and field flatening.

OPTICAL PATH

Figure 2:
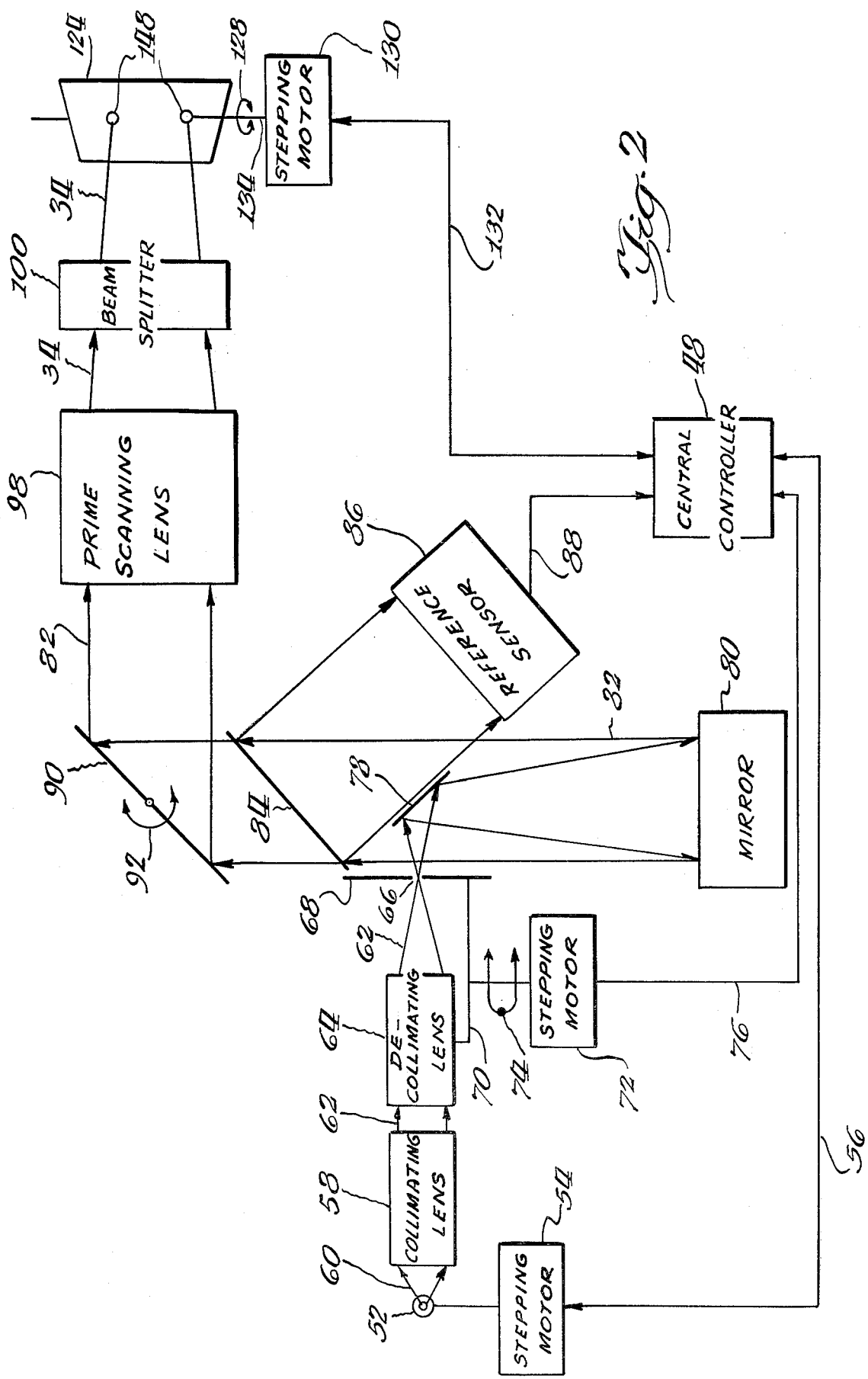
FIG. 2 is a schematic diagram illustrating a portion of the optical system and a portion of the electromechanical system of the apparatus as constructed in accordance with the invention and uses the method of the invention.

Turning now to FIGS. 2, 3 and 4, there is illustrated in FIG. 2 a white light source 52 which may be such as a ZENON high pressure compact arc lamp. Positioning of the source 52 to align the most intense part of the arc with the optical path is by way of stepping motor 54 under control of central controller 48 by way of leads 56. It will be understood that concerning all of the stepping motors under control of central controller 48, that there is suitable feedback to controller 48 in the form of limit switches and sensors as are desired.

Collimating lens 58 collimates the radiant energy 60 from source 52 into beam 62 which is directed onto decollimating lens 64 which focuses beam 62 through pinhole 66 of aperture plate 68. Decollimating lens 64 and aperture plate 68 are fixed relative to each other on a fixture 70 which is driven by stepping motor 72 in the directions shown by arrow 74. Stepping motor 72 is under control of central controller 48 through leads 76 and is used to maintain beam 34 in focus from scan line to scan line as will be described more fully hereinafter.

This arrangement of decollimating lens 64 and aperture plate 68 provides focusing motion of the pinhole 66 while maintaining the focus of the source 52 on the pinhole 66.

The diverging light from the pin hole 66 is reflected from a small elliptical mirror 78 to an achromatic Magin mirror 80 which collimates the beam once again. The Magin mirror 80 is corrected for spherical abberation and primary axial color but introduces a negative secondary color abberation into the collimated light beam 82 which is used downstream in the optical path and which will be described more fully hereinafter. Collimated beam 82 returns past the elliptical mirror 78 to a beam splitter 84 which reflects a portion of beam 82 to a reference sensor 86. The radiant energy reflected onto reference sensor 86 is converted into an electrical analog signal representing the intensity of source 52 and is fed to central controller by way of lead 88. The signal on lead 88 is used to compensate the system for fluctuations in the intensity of the radiant energy output by source 52.

The remainder of beam 82 passes through beam splitter 84 to a galvanometer mirror 90 driven by a galvanometer driver 92 by way of leads 93 from controller 48. Galvanometer mirror 90 rotates in the direction illustrated by arrow 92 and is used to deflect beam 34 across the scan lines. Galvanometer driver 92 is illustrated only in FIG. 3 for clarity of the drawing. Crossed lines 86 on the surface of galvanometer mirror 90 in FIG. 3 represent that collimated beam 82 is directed into the figure.

Collimated beam 82 then is reflected by mirror 90 onto a highly corrected six element prime scanning lens system 98 which introduces a positive secondary color abberation into beam 82. This positive secondary color aberration cancels out the negative secondary color abberation introduced by Magin mirror 80 to provide color corrected focusing of beam 34 on the original image 33. The color correction and details of the Magin mirror 80 and prime scanning lens 98 will be discussed hereinafter.

The function of prime scanning lens 98 is to focus the scanning collimated beam 82 into a flying spot linear scan at the target or image plane in which original image 33 is located. The converging beam which exists from the prime scanning lens 98 is the beam 34 of white light discussed hereinbefore.

A portion of converging beam 34 is reflected by beams splitter 100 onto a position grating 102 which alternately obstructs and passes the split beam 104 through condenser 106 to sensor 108. Position grating 102 may comprise such as a transparent member carrying alternating transparent and opaque areas along its length. The split beam 104 is directed across the length of the grating 102 by galvanometer mirror 90. When beam 104 is transmitted through the position grating at a transparent area between opaque areas, beam 104 is directed by condenser lens 106 to grating sensor 108. Grating sensor 108 senses the intensity of the radiant energy of beam 104 and produces an electrical analog signal which it outputs on lead 110 to sample clock generator 112 which in turn provides a sample clock signal on lead 114 to central controller 48.

It is important that split beam 104 form a focused spot 116 on the surface of position grating 102 to obtain a sharp edge in the electrical analog signal output on lead 110 from grating sensor 108. If this sharp edge does not occur, the electrical analog signal output by grating sensor 108 will be poorly defined and will not accurately indicate the position of coverging beam 34 on the original image 33.

Focusing of dot 116 on position grating 102 during a scan line is by way of lens 98, while focusing of dot 116 on grating 102 from scan line to scan line of the entire scan cycle is by way of stepping motor 118, provided to move position grating 102 in the direction indicated by arrow 120. Stepping motor 118 is operated under the control of central controller 48 through leads 122 in a manner which will be described hereinafter.

The spacial period of the grating carried by position grating 102 is approximately four times the desired sample position center distance. The signal carrier on lead 110 thus is one-fourth the desired sample position frequency and is used by sample clock generator 112 to provide sample clock signals on lead 114 for each of the desired sample positions.

The converging beam 34 which is transmitted by beam splitter 100 is reflected by a raster mirror 124 through glass plate 126 to the target plane in which original image 33 is located. Raster mirror 124 is driven in the direction shown by arrow 128 by stepping motor 130 under control of central controller 48 through leads 132.

Raster mirror 124 is rotatable around a longitudinal axis 125 thereof and the longitudinal axis 125 thereof is arranged spaced from and parallel to original image 32. The scan lines thus produced are such that the scan lines are parallel to the longitudinal axis 125 the longitudinal axis 125 essentially perpendicular to the center scan line of the scanning pattern.

The mechanical connection 134 between stepping motor 130 and raster mirror 124 is schematically illustrated in FIG. 2 by a straight line and is more fully illustrated in FIG. 3.

Mechanical connection 134 is essentially a lead screw/nut connection and includes a lead screw 136 connected at one end to stepping motor 130 and rotatably driven thereby. Lead screw 136 and stepping motor 130 respectively are mounted by fixtures 138 and 140 which allow only the rotation of lead screw 136. Nut 142 is engaged on the thread of lead screw 136 and is driven thereby in the direction indicated by arrow 144. One end of a shaft 146 is fixed to the raster mirror 124 while the other end passes through an opening in nut 142 and is freely slidable therein. Thus when leads screw 136 is rotated by stepping motor 130, nut 142 is moved along the axis thereof which in turn rotates raster mirror 124 through shaft 146.

As has been stated, the galvanometer mirror directs converging beam 34 across a scan line of the original image 33 while raster mirror 124 directs converging beam 34 from scan line to scan line, and a raster scan of the original film 33 is generated.

The dashed line converging beam 34 illustrated in FIGS. 3 and 4 is intended to illustrate that raster mirror 124 reflects beam 34 from one edge to the other of original image 33. It should be noted that the circles 148 lying on the surface of raster mirror 124 in FIG. 2 represent that converging beam 34 is directed out of FIG. 2.

The light or modulated beam 38 which is transmitted by the original image 33 passes through glass plate 150 and is converged by cylinder condenser lens 152 to mirror 154. Lens 152 contains a cylinder element because the exit pupil location generated by raster mirror 124 is closer to the imaging plane than is the exit pupil generated by the galvanometer mirror 90.

Diverging beam 38 from mirror 154 is directed onto first dichroic mirror 156 which splits a portion of beam 38 therefrom onto a red sensor 158. The beam 160 so split contains only the wavelength of the color red with which it is desired to sense the original image. The remainder of the diverging beam 38 transmitted by dichroic filter 156 is directed onto a second dichroic filter 162 which reflects a second portion of beam 38 onto green sensor 164. The split beam 166 contains only the wavelength of beam 38 which is associated with the color green with which it is desired to sense the original image. The remainder of beam 38 which is transmitted by second dichroic filter 162 is directed onto a blue sensor 168 which senses only the wavelength of the color blue with which it is desired to sense the original image.

Sensors 158, 164 and 168 convert the radiant energy impinging thereon in the form of beams 160, 166 and 38 respectively into electrical analog signals having amplitudes directly related to the intensity of the associated beams. Sensors 158, 164 and 168 are located a distance from the original image which provides that their sensor faces are essentially completely covered by the respective beams 160, 166 and 38. It will be understood that folding mirrors may be included in the optical path as desired and that folding mirrors included in the description of the optical path herein may be deleted.

LENSES AND LENS SYSTEMS

The major optical element of flat bed scanner system are the Mangin mirror 80, the prime scanning lens system 98, and the cylinder condenser lens 152. The remainder of the optical elements such as the collimating and decollimating lenses 58 and 64, the beam splitters 84 and 100, the galvanometer and raster mirrors 90 and 124, the glass plates 126 and 150 and the dichroic filters 156 and 162 are common elements which may be constructed and arranged as desired in accordance with well known principles, and will not be described further herein.

Prime scanning lens 98 comprises elements L1-L6 and housing and mounting hardware schematically illustrated by the block in FIG. 2, for mounting the elements L1-L6 in the flat bed scanner system. The housing and mounting hardware are not specifically illustrated in the drawings and may be of any configuration desired to satisfy the requirements described hereinafter.

Elements L1-L6 have surfaces defined by radii R1-R10, as shown in FIG. 5. From the object end, there is a first positive group L1 having a convex object side surface; a second negative group L2-L2 having a convex object side surface; a third negative group L4, L5 having a concave object side surface; and a fourth positive group L6 having a convex image side surface.

The first and second groups are arranged adjacent one another; the third and fourth groups are arranged adjacent one another; and the second and third groups are arranged spaced from one another.

The lens of FIG. 5 is highly corrected for primary color aberrations and is defined substantially by the data of Table I as scaled to a focal length of 359.3 millimeters:

TABLE I

| Lens | Radius | Axial Distance Between Surfaces (mm) | $N_d$ | $V_d$ |
|------|--------|--------------------------------------|-------|-------|
| R1   | 94.47  |                                      |       |       |

TABLE I-continued

| Lens | Radius | Axial Distance Between Surfaces (mm) | $N_d$ | $V_d$ |
|---|---|---|---|---|
| L1 |  | 10.00 | 1.71300 | 53.83 |
|  | R2 153.27 |  |  |  |
|  |  | 0.70 |  |  |
|  | R3 132.03 |  |  |  |
| L2 |  | 15.00 | 1.78831 | 47.39 |
|  | R4 220.51 |  |  |  |
| L3 |  | 13.86 | 1.69895 | 30.07 |
|  | R5 73.92 |  |  |  |
|  |  | 26.71 |  |  |
|  | R6 −67.06 |  |  |  |
| L4 |  | 6.70 | 1.60342 | 38.03 |
|  | R7 −277.80 |  |  |  |
| L5 |  | 15.00 | 1.67790 | 55.20 |
|  | R8 −90.88 |  |  |  |
|  |  | 0.50 |  |  |
|  | R9 885.07 |  |  |  |
| L6 |  | 10.00 | 1.78831 | 47.39 |
|  | R10 −317.86 |  |  |  |

The prime scanning lens is used in the flat bed scanner system primarily as a field flattening lens to maintain beam 34 in focus at the imaging plane from edge to center to edge of a scan line. Because the prime scanning lens 98 is only a refractive lens system and because beam 34 is comprised of white light having a plurality of different wave lens, the focusing of the different colors of wavelengths of the beam 34 by the prime scanning lens on the imaging plane is good only to a first approximation. As is well known, with only a refractive system, the best secondary color correction which may be obtained is on the order of the focal length divided by 1000 for the wavelength region of from 436 mµ to 644 mµ, and in a positive direction from the imaging plane. It is important that the three desired colors which are used for sensing the original image be as close as is possible to being in focus on the imaging plane where the original image is located, to insure that only areas which are sized equal to the desired area sizes are sensed to maintain the quality of the output data. One should remember that the data which is being output from the flat bed scanner system is finer than that which has previously been obtained, and even small errors in the sensing of the original image may be reflected as gross errors in the output data, degrading the overall system performance. The first approximation color correction provided by the prime scanning lens system 98 may be improved upon by the addition of a reflective Mangin mirror 80.

Figure 6:
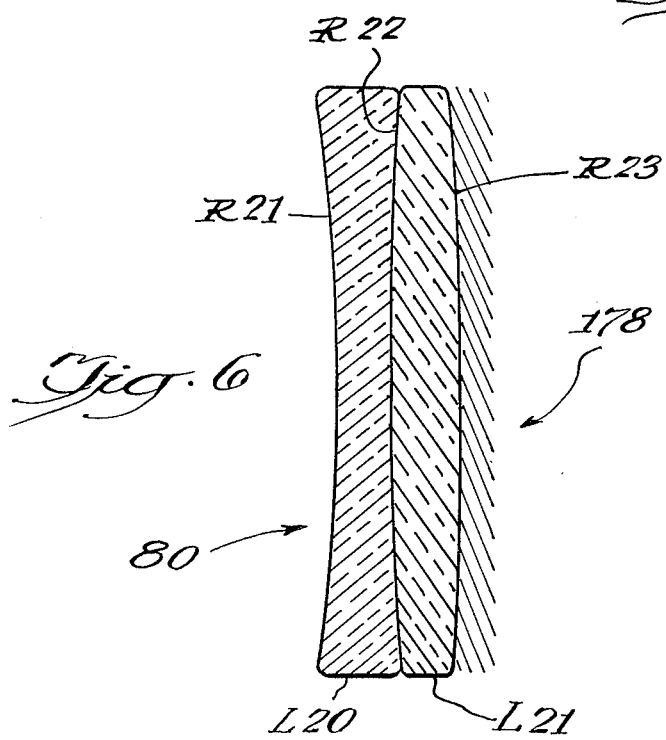
FIG. 6 is a representation of elements of a Mangin mirror system embodying the invention.

The Mangin mirror 80 comprises elements L20 and L21 illustrated in FIG. 6 and suitable housing and mounting hardware for mounting the element in the optical path of the flat bed scanner system schematically represented in FIG. 2. The housing and mounting hardware parts are not specifically illustrated in the drawing as they may be of any construction and arrangement as is desired.

The mirror or lens as illustrated in FIG. 6 comprises a single group of elements L20 and L21 having a concave object and image side surface and a convex side surface carrying a reflective material 178.

The lens of FIG. 6 is defined substantially by the data of Table 2, as scaled to a focal length of 317.8 mm.

TABLE II

| Lens | Radius | Axial Distance Between Surfaces (mm) | $N_d$ | $V_d$ |
|---|---|---|---|---|
|  | R21 −228.48 |  |  |  |

TABLE II-continued

| Lens | Radius | Axial Distance Between Surfaces (mm) | $N_d$ | $V_d$ |
|---|---|---|---|---|
| L20 |  | 9.49 | 1.62588 | 35.7 |
|  | R22 1767.08 |  |  |  |
| L21 |  | 9.05 | 1.78472 | 25.76 |
|  | R23 −440.00 |  |  |  |

The lens disclosed may of course be scaled otherwise than as described as may be desired.

As described hereinbefore, Mangin mirror 80 is corrected for spherical aberrations and primary axial color, but introduces a negative secondary color abberation into the collimated light beam 82. This negative secondary color abberation is added to or combined with the positive secondary color abberation introduced by the prime scanning lens 98 to provide focusing of the three desired scanning colors precisely on the imaging plane or original image 33.

Figure 7:
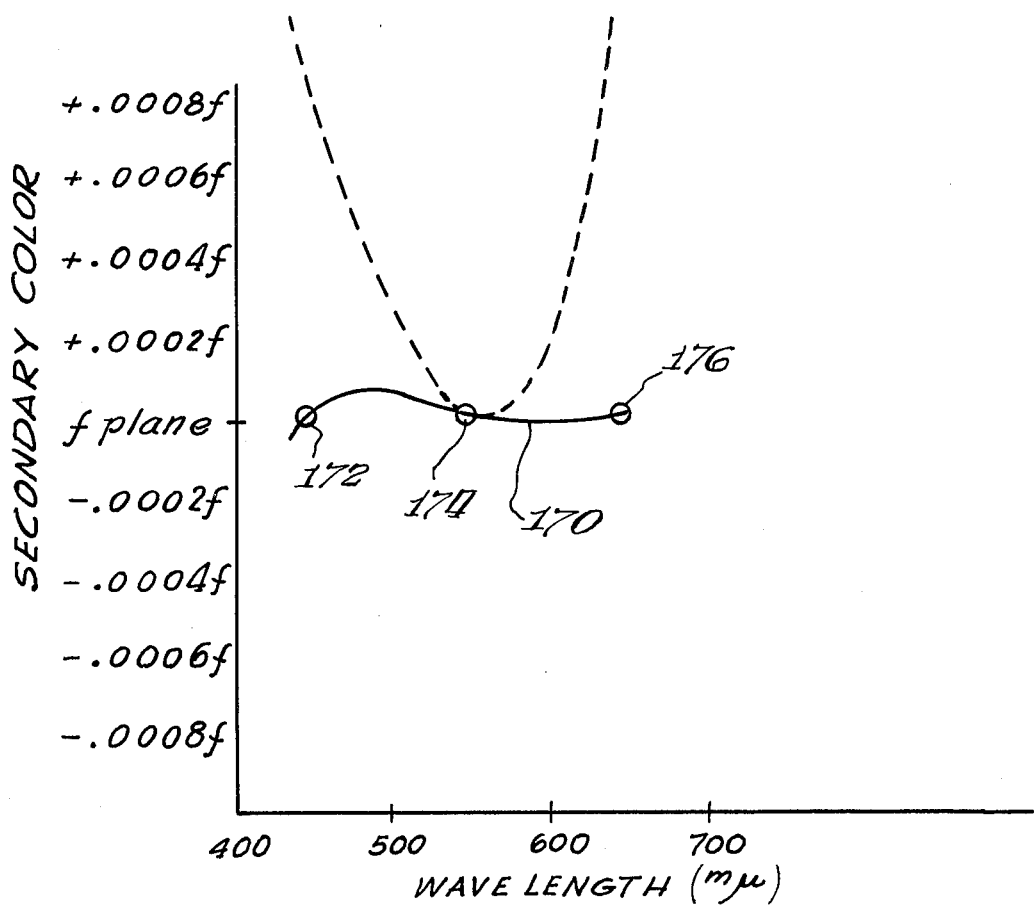
FIG. 7 is a graph of distances from a focal plane versus wavelengths of light and illustrates the distances from the focal plane at which different wavelengths of light are in focus in accordance with the apparatus and method of the invention.

This is illustrated in FIG. 7, which is a graph having in ordinate, the center line of the focal plane and distances in the positive and negative direction therefrom, and in abcissa, the wavelengths which may be contained in the beam 34 of white light between approximately 400 and 700 millimicrons. The solid line 170 indicates the color correction obtained with the hereinbefore described combination of the prime scanning lens 98 and Mangin mirror 80. The three desired scanning colors which are essentially blue, green and red are represented respectively by points 172, 174 and 176 on curve 170 and it may be seen that these points lie precisely in the focal plane. The dashed line indicates the focusing of the different wavelengths which may be obtained with only a refractive lens system such as prime scanning lens 98.

The last major element of the flat bed scanning optics is the cylinder condenser lens 152 whose elements are illustrated in FIGS. 8 and 9. FIG. 8 is a plan view of elements L31 and L32 of cylinder condenser lens 152 in the direction in which light from the imaging plane enters the cylinder condenser lens 152. As illustrated in FIG. 9, the lens 152 comprises elements L31, L32 and L33 having surfaces defined by radii R31 through R36. Element R31 has a configuration of a segment of a cylinder and elements L32 and L33 have configuration of a segment of a sphere.

The lens of FIG. 9 comprises from the object end a first negative group L31 having a flat object side surface; a second negative group L32 having a flat object side surface and a third positive group L33 having a flat image side surface.

The lens of FIG. 9 is defined substantially by the data of Table 3.

TABLE III

| Lens | Radius | Axial Distance Between Surfaces (mm) | $N_d$ | $V_d$ |
|---|---|---|---|---|
| L31 | R31 ∞ |  |  |  |
|  |  | 12.0 | 1.52249 | 59.5 |
|  | R32 −281.61 cylinder |  |  |  |
|  |  | 1.0 |  |  |
| L32 | R33 ∞ |  |  |  |
|  |  | 30.0 | 1.52249 | 59.5 |
|  | R34 −225.0 |  |  |  |
|  |  | 1.0 |  |  |
|  | R35 225.0 |  |  |  |
| L33 |  | 30.0 | 1.52249 | 59.5 |

TABLE III-continued

| Lens | Radius | Axial Distance Between Surfaces (mm) | $N_d$ | $V_d$ |
|---|---|---|---|---|
| R36 | ∞ | | | |

The lens disclosed may, of course, be scaled as desired for other sizes. As has been stated hereinabove, the spherical element is required because the exit pupil location generated by the raster mirror 124 is closer to the image plane than the exit pupil generated by the galvanometer mirror 90.

ELECTRONICS

The electronics described hereinafter are used in the flat bed scanner system to convert the transmission characteristic of the original image 33 as carried by modulated beam 38 into binary digital data representing the density of the original image 33. This conversion occurs in three colors and along with the conversion process, correction is made in the data for radiant energy losses occurring through the optical path and compensations are made for fluctuations in intensity of the white light source 52.

Turning now to FIG. 10, there is illustrated generally the interrelationships between the optical system and the electronics of the flat bed scanner system.

White light source 52 supplies a beam of white light 82 a portion of which is deflected by beam splitter 84 to a reference sensor 86. The remainder of beam 82 passes through the optical path which is represented herein by block 200 but which has described in detail hereinabove as including several optical elements. A beam 104 is split from the optical path and is passed across a position grating schematically represented in FIG. 10 with a dashed line, the dashed line representing the opaque and transparent spacings of the grating. Beam 104 is transmitted through the transparent spacings of grating 102 to grating sensor 108 and therefrom the grating pulse signal is transmitted to sample clock generator 112 over lead 110. Converging beam 34 from optical path 200 is directed onto transparent member 32 carrying original image 33 with original image 33 modulating beam 34 according to the densities which form the original image. Beam 38 represents the modulated beam of light which is transmitted through the original image and which carries the transmission characteristics of the original image. Beam 38 is directed through an optical path 202 which has been described in detail hereinabove as containing several optical elements which will not be redescribed here in detail. Beam 38 then is directed upon dichroic filters 156 and 162 and is split thereby into beams 160, 166 and 38 which are directed respectively onto red sensor 158, green sensor 164 and blue sensor 168.

The outputs of sensors 86, 158, 164 and 168 are analog electrical signals having amplitudes directly related to the intensity of radiant energy which is directed onto the face of the sensors. These analog electrical signals are output respectively on leads 204, 206, 208 and 210. The electrical analog signal output by reference sensor 86 on lead 204 is applied to reference channel electronics 212, the signal output on lead 206 from red sensor 158 is applied to red channel electronics 214, the signal output on lead 208 from green sensor 164 is applied to green channel electronics 216 and the signal output on lead 210 from blue sensor 168 is applied to the blue channel electronics 218. It is in the red, green and blue channel electronics 214, 216 and 218 that the desired conversion, correction and compensation operations are performed on the data. The density data are output from the red, green and blue channel electronics on leads 220, 222, and 224 respectively to output buffer 226 and thereafter are output from the flat bed scanning system on lead 228. It should be noted that the leads 220, 222, 224 and 228 are shown as single lines but in actuality are each eight bits of parallel data.

The output of reference channel electronics 212 is carried on lead 230 to each of the color channel electronics 214, 216 and 218 and is used for compensation purposes. The outputs 220, 222 and 224 of the color channel electronics also are fed to a base line memory 232 which is used for correction purposes, the outputs of base line memory being carried by leads 234, 236 and 238 respectively to the red, green and blue channel electronics 214, 216 and 218. Again leads 230, 234, 236, 238 are shown as single lines but in actuality represent eight bits of parallel data.

Sample clock signals are produced by the sample clock generator 112 and are fed on leads 240 to each of the references and color channel electronics. The sample clock signal also is fed to the central controller 48 on lead 114 which is used therein to clock or step counters which count the sample positions in each scan line and which count the number of scan lines.

Control of the scanning by central controller 48 to optical path 200 is by way of leads 242 some of which have been described hereinbefore in conjunction with the optical system, the remainder of which will be described hereinafter in more detail in conjunction with the electromechanical aspect of the flat bed scanner.

A base line calibration signal is fed on lead 244 from central controller 48 to each of the color channel electronics. Address and control leads are fed on leads 246 from central controller 48 to the base line memory 232, leads 246 again being indicated by a single line in FIG. 10 but in actuality representing a plurality of leads. Control of the outputting of the data from the flat bed scanner system is by way of lead 248 from central controller 48 to the output buffer 226.

FIG. 11 illustrates in more detail how the conversion, correction and compensation operations are performed on the information from sensors 86, 158, 164 and 168. All three of the color channels and the reference channel receive their electrical analog signals and perform any amplification and offset as may be desired in pre amps 250 through 256. The amplified and offset signals from pre amps 250 through 256 are carried by leads 258 through 264 respectively to A to D and log conversion circuits 266 through 272 wherein the analog electrical signals are converted to digital signals and the amplitude of the signals are converted through log look up tables to equivalent natural log values.

The outputs of the A to D and log conversion circuits 266 through 270 of the color channels only then are applied respectively to base line correction circuits 274, 276 and 278 through leads 280, 282 and 284. In the base line correction circuits, the signals from the base line memory 232 which are used to correct for light losses through the optics are added to the signals from the A to D analog conversion circuits 266 through 270.

The output of base line correction circuits 274 through 278 then are applied to reference compensation circuits 286, 288 and 290 through leads 292, 294 and 296. In the reference compensation circuits 286, 288 and 290, the base line corrected signals from circuits 274, 276 and 278 respectively are subtracted from the output signals of A to D and log conversion circuit 272 of the reference channel. Subtraction essentially performs the operation of dividing the transmission signal into unity as is required by the general transmission to density formula described hereinabove. The outputs of reference compensation circuits 286, 288 and 290 thus are in units of density and are output to density data output buffer 228 on leads 234, 236 and 238.

The base line memory 232 is essentially comprised of three separate memory banks one for each color channel and are illustrated as blue base line memory 298, green base line memory 300 and red base line memory 302.

From the figures it may be seen that all three of the color channel electronics are of the same construction and arrangement as the same functions must be performed in each channel. The reference sensor electronics however contains only pre amp 256 and A to D analog conversion circuit 272. Thus by describing one of the color channels in detail, all three of the color channels and the reference channel may be completely understood.

REFERENCE AND COLOR CHANNEL ELECTRONICS

The conversion of the analog electrical signals into desired digital binary words may best be understood by considering that the electrical analog signal first is converted into a digital word having a value equal to the amplitude of the analog signal. This digital word then is used as an address in a memory look up table to produce another digital word which represents the base 10 logarithm log of the value of the address and therefrom also the base 10 log of the amplitude of the electrical analog signal.

The log converted signals then are corrected for losses in the intensity of the light occurring in the optical system which occur in a non-linear manner across the area of the original image. This correction is referred to as base line correction and is performed by adding values to the log converted signals which values have been empirically determined prior to a scanning cycle. The base line corrected signals then are presented to a reference compensation circuit, which provides compensation for fluctuations in the intensity of the light source.

In the reference compensation circuit, the base line corrected signals act as the subtrahand and are subtracted from the A to D and log converted signals from the reference sensor, which signals act as the minuend to compensate for fluctuations in the intensity of the source 52. The output of the reference compensation circuit then is the output data having the desired density units and is buffered for output from the flat bed scanner system.

Referring back to the formula:

$D = \log 1/T$ one may roughly state the above conversion, correction and compensation operations with the following formula:

$D = \log T_{ref} [\log T_{OI} + f \text{(format)}]$

Where $T_{ref}$ represents the transmission of the reference or the intensity of the lamp; $T_{OI}$ represents the transmission characteristic of the original image at any sample position and for any one of the three color channels; an f (format) represents the base line compensation value which is empirically determined by the system prior to a scanning cycle and which represents the losses in the optical system occurring at different locations across the original image.

It may readily be understood that to obtain the desired output density range of from 0.00D 3.00D, one desires to construct and arrange the conversion, correction and compensation electronics with a greater range than is output to provide for such as aging of the light source, fluctuations therein, etc. This is explained in connection with FIG. 14.

Figure 14:
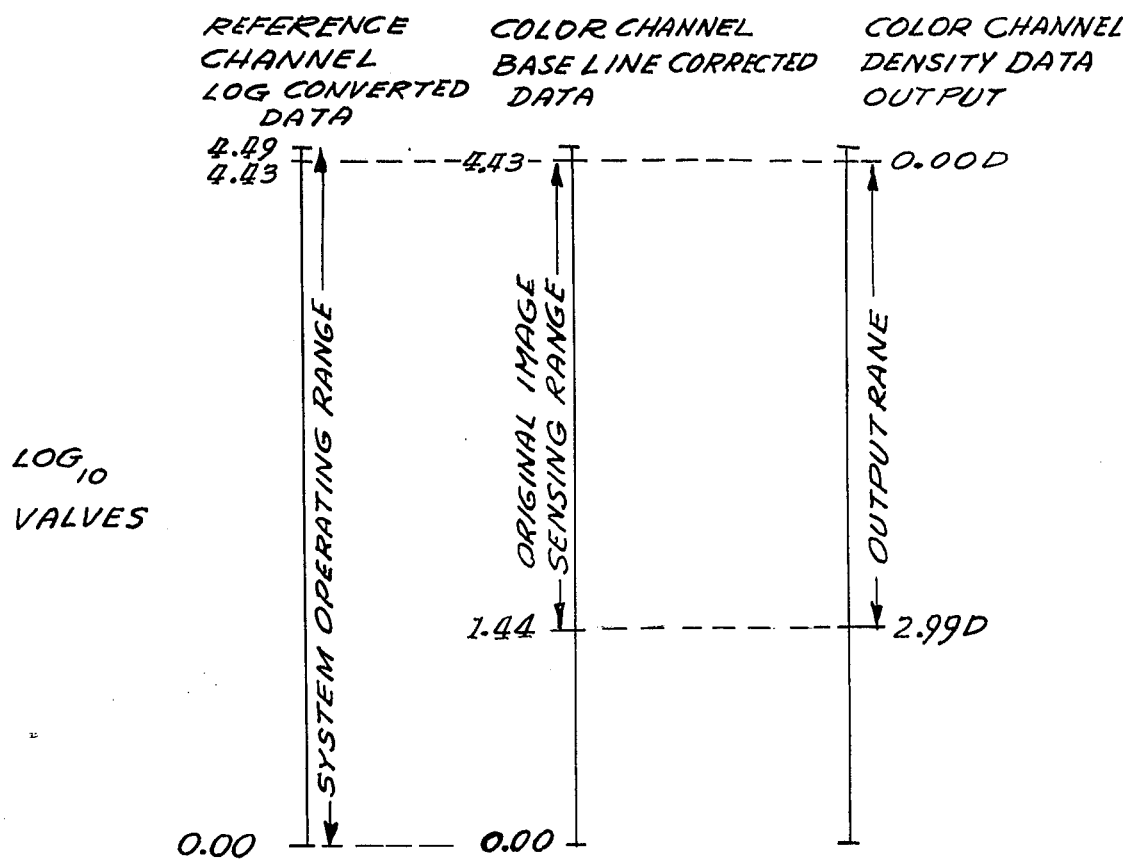
FIG. 14 is a bar chart illustrating in log values the ranges of different portions of the electronic system.

FIG. 14 graphically illustrates in natural log values the several ranges of values used in the reference and color channel electronics. Along the bar having the heading of reference channel log converted data it is illustrated that the system operating range uses log converted values of from 0.00 to 4.49. Although this one bar is labelled as the reference channel log converted data, it also represents the color channel log converted data as all four of the A to D and log conversion circuits are identical. When the system is initially calibrated, the preamplifiers 250 to 256 are adjusted so that the outputs of the A to D and log conversion circuits 266 to 272 are set to provide base 10 log value outputs of 4.43 without any original image. This provides log values of from 4.43 to 4.49, or 0.07 values with which to compensate for fluctuations upwardly in the intensity of the light source.

It will be understood that for a sample position of an original image which is essentially clear, the modulated beam representing the transmission quality of that particular sample position of the original image will be relatively unmodulated. This then converts to essentially no change in the beam from the light source and is represented in FIG. 14 by the center column labeled the color channel base line corrected data, having a log converted value of 4.43.

At the other end of the transmission characteristics of the original image, if a sample position of the original image is essentially opaque only a small portion of the beam will be transmitted by the original image, resulting in a smaller amplitude of the analog electrical signal. This in turn translates to the 1.44 log converted value represented on the color channel base line corrected data line of FIG. 14. Thus, the original image sensing range is from 1.44 to 4.43 log values as the data is provided in the color channels from the base line correction circuits.

One may graphically represent the color channel density output with the line so labelled in FIG. 14. These output values are obtained by subtracting the color channel base line corrected data from the reference channel log converted data. For a sample position of the original image which is essentially clear, a color channel base line corrected data value of 4.43 is subtracted from a reference channel log converted value data of 4.43 to produce a density data output value of 0.00D. For a sample position which is essentially opaque, a color channel base line corrected data value of 1.44 is subtracted from the reference channel log converted data value of 4.43 to provide a color channel density data output of 2.99D. Thus the output density range is from 0.00D to 2.99D.

The manipulation of the data from the preamps 250 through 256 to the output of the reference compensation circuits 286 through 290 is simplified by letting each step of the digital binary words used through the color channel electronics equal the sam log value of 0.01171875. By using this scheme then, simple addition and subtraction circuits may be used for the base line correction circuits and the reference compensation circuits. Forming of the digital binary words having steps representing this unit of density are formed in the A to D and log conversion circuits 266 through 272.

A to D and log conversion circuits 266 through 272 are identical to each other so that an explanation of one is an explanation of all. The A to D and log conversion circuits may be best understood by considering that they operate on the principal of look up tables. That is to say that the analog signals from the color sensors are converted to digital signals having values representing the amplitudes of the analog signals. The digital signals then are applied to memory circuits with the values addressing locations which contain values corresponding to the base 10 logs of those addresses.

To utilize readily available components, in every color channel, the analog signals from the color sensors are preamplified and operated on, or separated or divided into three mutually exclusive amplitude bands for further processing. These bands may be referred to as the high, middle and low amplitude bands and the analog signals occurring in each band are separately digitized and applied to memory circuits. Suitable gating is provided to select the proper band memory circuit to provide the proper output therefrom.

Figure 12:
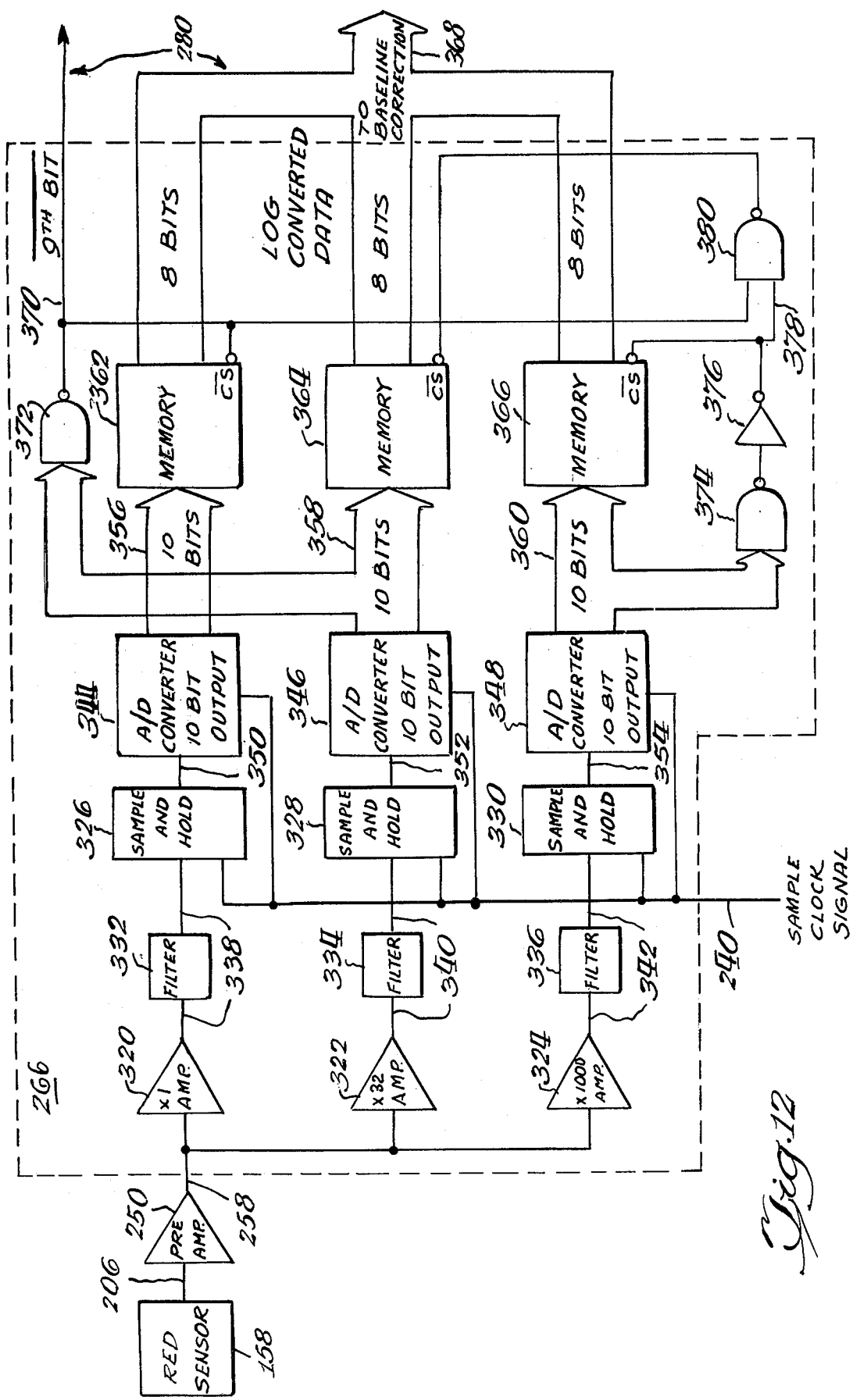
FIG. 12 is a more detailed block diagram of the A to D and log conversion portion of the red color channel illustrated in the diagram of FIG. 11.

In FIG. 12 there is shown red sensor 158 providing an electrical analog signal on lead 206 to preamplifier 250. The output of preamplifier 250 on lead 258 is applied to the input of amplifiers 320, 322 and 324. Amplifier 320 provides an amplification of about unity or 1 and separates the high amplitude analog signals on lead 258 into the high band. Amplifier 322 provides an amplification of about 32 and separates the middle amplitude analog signals on lead 258 into the middle band. Amplifier 324 provides an amplification of about 1000 and separates the low amplitude analog signals on lead 258 into the low band. Offsetting is provided by amplifiers 320 through 324 for proper operation of components occurring later in the processing of the signals.

The outputs of amplifiers 320 through 324 are applied to sample and hold circuits 326, 328 and 330 by way of filters 332, 334 and 336 on leads 338, 340 and 342 respectively. Filters 332, 334 and 336 are provided to remove any undesired noise such as may be introduced by the system. The outputs of sample hold circuits 326, 328 and 330 are applied to A to D converters 344, 346 and 348 on leads 350, 352 and 354 respectively. Sample and hold circuits 326, 328 and 330 and A to D converter circuits 344, 346 and 348 are gated with the sample clock signal on lead 240 to provide sampling of the data only at the desired sample positions of the original image. It will be remembered that the sample clock signal is generated from sample clock generator 112 in response to a reference beam passing across a reference grating 102.

Sample and hold circuits 326, 328 and 330 operate as their labels imply, that is to say they sample the amplified analog signal applied thereto and hold them during a period of the sample clock signal. A to D converters 344, 346 and 348 convert the amplitudes of the held analog signals into 10-bit binary digital words with the values of the 10-bit words representing the amplitudes of the held analog electrical signals.

The 10-bit words are output on leads 356, 358 and 360 and are applied to memory circuits 362, 364 and 366. Memory circuits 362, 364 and 366 provide the look up tables for the long conversions and have their output combined in a "wired or" configuration as leads 368. Suitable gating is provided which will be described hereinafter so that only the output of one memory circuit is enabled at any one time. The outputs of the memory circuits are in the form of binary digital words having 8-bits each and in addition, there is to provide an inverted 9th-bit on lead 370 which is used to provide the desired system operating range.

It has been stated that amplifiers 320, 322 and 324 separate the analog signal on lead 258 into the high band, middle band and low band, respectively. Thus, the high band circuit comprises amplifier 320, filter 322, sample and hold circuit 326, A to D converter 344 and memory 362; the middle band circuit comprises amplifier 322, filter 334, sample and hold circuit 328, A to D converter 346 and memory 364; and the low band circuit comprises amplifier 324, filter 336, sample and hold circuit 330, A to D converter 348 and memory 366.

The gains of amplifiers 320, 322 and 324 are selected so that an analog signal having an amplitude occurring in the low band will be amplified by the amplifier 324 by an amount so that the low band A to D converter 348 will operate properly. This analog signal having an amplitude occurring in the low band will now however be amplified sufficiently by amplifiers 322 and 320 in the middle and high bands to operate properly the middle and high band A to D converters 346 and 344 and therefore the outputs of those A to D converters will be all logic 0's.

Any one logic 0 level output by A to D converter 346 is gated in NAND gate 372 to disable to chip select of high band memory 362 by way of lead 370. Any one logic 0 level output by low band A to D conveter 348 indicates that the amplitude of the analog signal on lead 258 is within the low band and this logic 0 level is gated through NAND gate 374 and inverter 376 and then by way of lead 378 to enable the chip select of the low band memory 366. The chip select disable signal on lead 370 is gated together with the chip select enable signal on lead 378 in NAND gate 380 to disable the chip select of the middle band memory 364. Thus when an analog electrical signal has an amplitude occurring in the low band, only the low band memory 366 is enabled and provides 8-bits of data on leads 368 with the inverted 9th-bit of data being represented by a logical 1 on lead 370.

If an analog electrical signal occurs on lead 258 having an amplitude in the middle band, amplifier 324 will amplify this signal to a great amount such that the output of A to D converters 348 will be all logical 1's. This will be gated through NAND gate 347 and inverter 376 to form a logical 1 on lead 378 which disables the chip select of memory 366. Amplifier 322 will amplify this signal so that it occurs in the proper operating range of A to D converter 346 which then will have at least one logic 0 output in turn is gated in NAND gate 372 to form a logic 1 on lead 370, which disables the chip select of high band memory 362, and is gated in NAND gate 380 to provide a logic 0 and enable the chip select of middle band memory 364. Thus, only the output of memory 364 is formed on leads 368 to provide the desired log conversion. The inverted 9-bit on lead 370 is again a logic 1.

If an analog electrical signal on lead 258 has an amplitude occurring in the high band, then amplifiers 322 and 324 will amplify this signal to a great amount so that A to D converters 348 and 346 will output all logical 1's. This forms a logic 1 on lead 378 which disables memory 366 but forms a logic 0 on lead 370, which enables the chip select of high band memory 362 and in turn disables the chip select of middle band memory 364 through NAND gate 380. Thus, only the output of high band memory 362 is provided on leads 368 with the inverted 9th bit being a logic 0.

The values output by memory circuits 362, 364 and 366 are the log converted values of the addresses applied thereto on leads 356, 358 and 360. It will be appreciated that in the higher regions of each band, there will be large overlaps in the values output of the memory circuits in response to the addresses applied thereto, i.e. several sequential addresses will produce the same log converted values. It further will be appreciated that there are about 128 different log values contained in each of memories 362, 364, and 366 to represent the desired 385 steps of log values and therefrom the log values of from 0.00 to 4.49. Additional steps may be provided in the memory circuits as desired to provide for overlap between the three bands but the total steps output must be 385. These 385 available steps of digital binary values will be reduced to the desired 256 steps of output in the reference compensation circuit.

BASE LINE CORRECTION CIRCUIT

The base line correction circuit uses values which have been empirically determined as a function of the location of the sample positions of the original image being sampled. Essentially, before a scanning cycle is commenced, an initialization cycle is performed by the scanner system to initialize the base line scanning system. During this initialization cycle, a scanning cycle is performed without an original image being present in the imaging plane and with the base line correction circuit being disabled by lead 244 from the central controller 48. Thus, signals are obtained on the outputs of the color channel electronics 234, 236 and 238 which represent the correction values or amounts of radiant energy lost in the optical system at each of the sampling positions. It will be understood that a loss of radiant energy through the optical system at a particular location will form a density data output value which appears to have a density value greater than 0.000 just as if an original image were modulating the beam passing through the optical system. The outputs of the color channel electronics then are loaded into memories 298, 300 and 302 as shown in FIG. 11, with addressing of each sample position being by way of a scan line counter and a sample position counter located in central controller 48. Of course, the scan line counter and sample position counter may be included in the sample clock generator 112 or elsewhere as desired.

To reduce the size of the base line memories 298, 300 and 302 the total area scanned is divided into 8,192 areas, represented by the areas between 128 scan lines and 64 sample positions with one correction value being determined for each scanning color in each area. The correction values are represented by data in the same form as the output data, that is to say 8-bit words parallel binary digital data.

Figure 15:
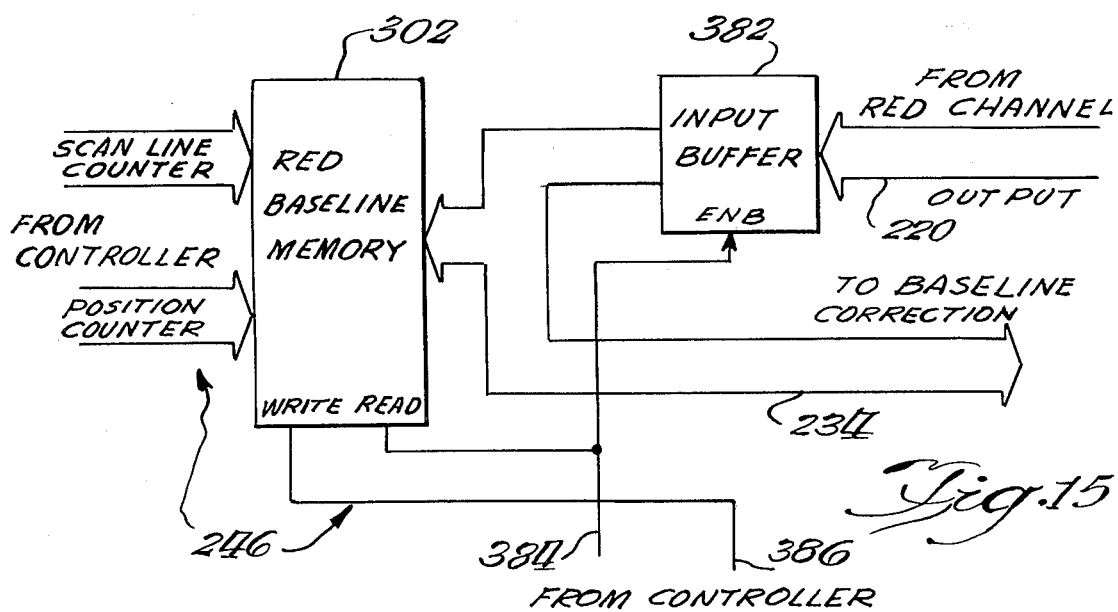
FIG. 15 is a more detailed block diagram of the base line memory of the red color channel illustrated in FIGS. 10 and 11.

For example, during the initialization cycle, central controller 48 places the red base line memory 302 in the read mode by way of lead 384 of FIG. 15 which is part of leads 246 of FIG. 11, enables input buffer 382 to allow data from the red channel output to be presented to the input of the red base line memory 302 and also disables the input buffer 388 of base line correction circuit 274 by way of lead 244. Thus the correction values are read into the base line memory 302 while no base line correction is performed in circuit 274.

During the scanning of an original image, the correction factors are addressed by the outputs of the scan line counter and position counter represented by leads 246 in FIG. 15 and the red base line memory 302 is placed in the write mode by controller 48 through lead 386. The data on leads 234 from the base line memory are presented to adder 390 shown in FIG. 13 through input buffer 388 which has been enabled by controller 48 through lead 244. The log converted signals on leads 368 also are presented to adder 390 with the sum forming the output of base line correction circuit 274 on leads 392. The inverted 9th bit on lead 370 from the A to D and log conversion circuit 266 is presented to a gate 394 along with the carry up signal from adder 390 to form the inverted 9th-bit signal on lead 396. In practice, the carry up signal from adder 390 will never occur, and the logic level occurring on lead 396. It will be noted that leads 392 and 396 form the group of leads 292 illustrated in FIG. 11. It further will be noted that during an initialization cycle the value of the output of buffer 388 is zero so that the output of adder 390 equals its input.

Figure 13:
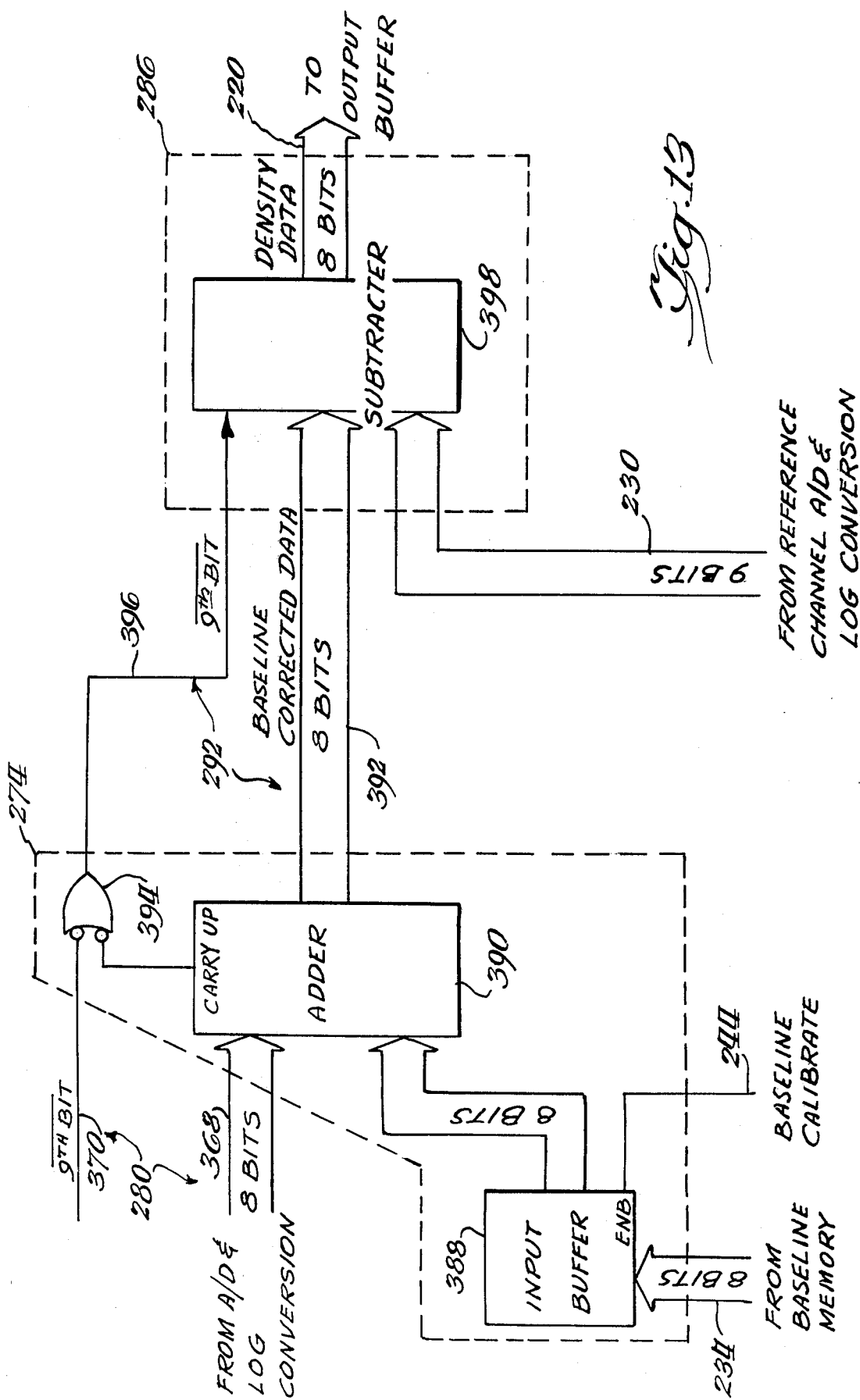
FIG. 13 is a more detailed block diagram of the base line correction and reference compensation circuits of the red color channel illustrated in the diagram of FIG. 11.

In reference compensation circuit 286, represented in FIG. 13, the nine bits of data from the reference channel A to D and log conversion circuit 272 are applied as the minuend to subtractor 398. The 8-bits of base line corrected data occurring on leads 392 and the inverted 9th bit occurring on lead 396 also are applied to subtractor 398 but as the subtrahand. The log values from the base line correction circuit then are subtracted from the log values from the reference channel and the output of subtractor 398 is the desired density data in the form of 8-bit words of parallel binary digital data. This output data is carried on leads 220 to the output buffer 226 for outputting from the flat bed scanning system.

SAMPLE CLOCK SIGNAL CIRCUIT

It has been explained hereinbefore generally that the sample clock signal is used to synchronize the sampling of data with the sensing of each of the sample positions on the original image and is derived from a pulse generated by grating sensor 108 in response to a reference beam 104 passing across a position grating 102.

More particularly the grating of the preferred embodiment is chosen to have line pairs having widths which are four times greater than the spot size used to sample the original image. In the preferred embodiment a ten micron spot size will therefore use a 40 micron line pair. The use of a grating having a 40 micron line pair has the advantage of being a less expensive grating than a grating having a finer line pair and produces a well defined pulse having a high signal to noise ratio with a less critical spot focusing on the grating.

Such a grating utilizes an electronic technique to insert sample clock signals between grating pulse signals received from the grating sensor which further provides immunity from erroneous sample clock signal generation or the lack thereof. Such an electronic technique provides a better than ±¼ sample position accuracy.

This electronic technique may best be understood by considering that a modulo n counter is clocked with a predetermined frequency f clock. At each pulse from the grating sensor or sync pulse, the count of the modulo n counter is latched into a latching circuit and the modulo n counter is cleared and restarts it count. The output of the latch is applied to a free running down counter operating at a clock frequency of 12 times the modulo n counter or 12 f. The output of the free running down counter thus provides a signal at its output which is 12 times the frequency of the sync pulse. The output of the down counter then is applied to a divide by 3 counter which provides a sample clock signal at a frequency which is 4 times the frequency of the sync signal. Thus it may be visualized that the sync signal is used to determine the modulo of a modulo n counter, the output of which is multipled in a 12f down counter, the output of which in turn is divided by 3 to provide the desired 4 sample clock signals interleaved between sync pulses.

This may be represented in the most general case by the formula:

$$(f1 \times f2)/A = M$$

where
 f1 is the frequency of the modulo n counter,
 f2 is the frequency of the down counter,
 A is the frequency of the divider circuit, and
 M is the frequency of the grating line pairs relative to the frequency of the sample positions.

It will be appreciated that as the galvanometer driven mirror 90 is advanced across one scan line, there will be very small variations in the periods of time produced between sync pulses from the grating sensor and accordingly there will be very small changes in the number n to which the modulo n counter counts between sync pulses. It is most important in a scanning system such as this that none of the sample positions ever be skipped or not be sensed, such lack of sensing causing the data for the entire scan line and the remainder of the image in some cases to be shifted. The sample clock generator circuit 112 therefore provides logic to prevent the loading of the latch unless there is a small change in the modulo n counter between the preceding latched number and the presently counted number.

This logic essentially comprises a magnitude comparator and an arithmetic logic unit (ALU) with which the absolute value of the count in the latch is subtracted from the absolute value of the count in the modulo n counter. If the result of this subtraction is greater than 3 then loading of the latch is disabled on the next sync pulse.

At the beginning of a new scan line, the difference between the count contained in the latch and the modulo n counter may properly be greater than 3 but it is still desired to load the latch with the number contained in the modulo n counter. In such a case a start counter is included in the logic to allow the loading of the latch with the number contained in the modulo n counter on the fourth sync pulse in a new line. It will be noted that the grating is provided with a predetermined number of gratings at the beginning of each scan line such as 4 with which to initialize the production of a sample clock signal for a scan line.

Figure 16:
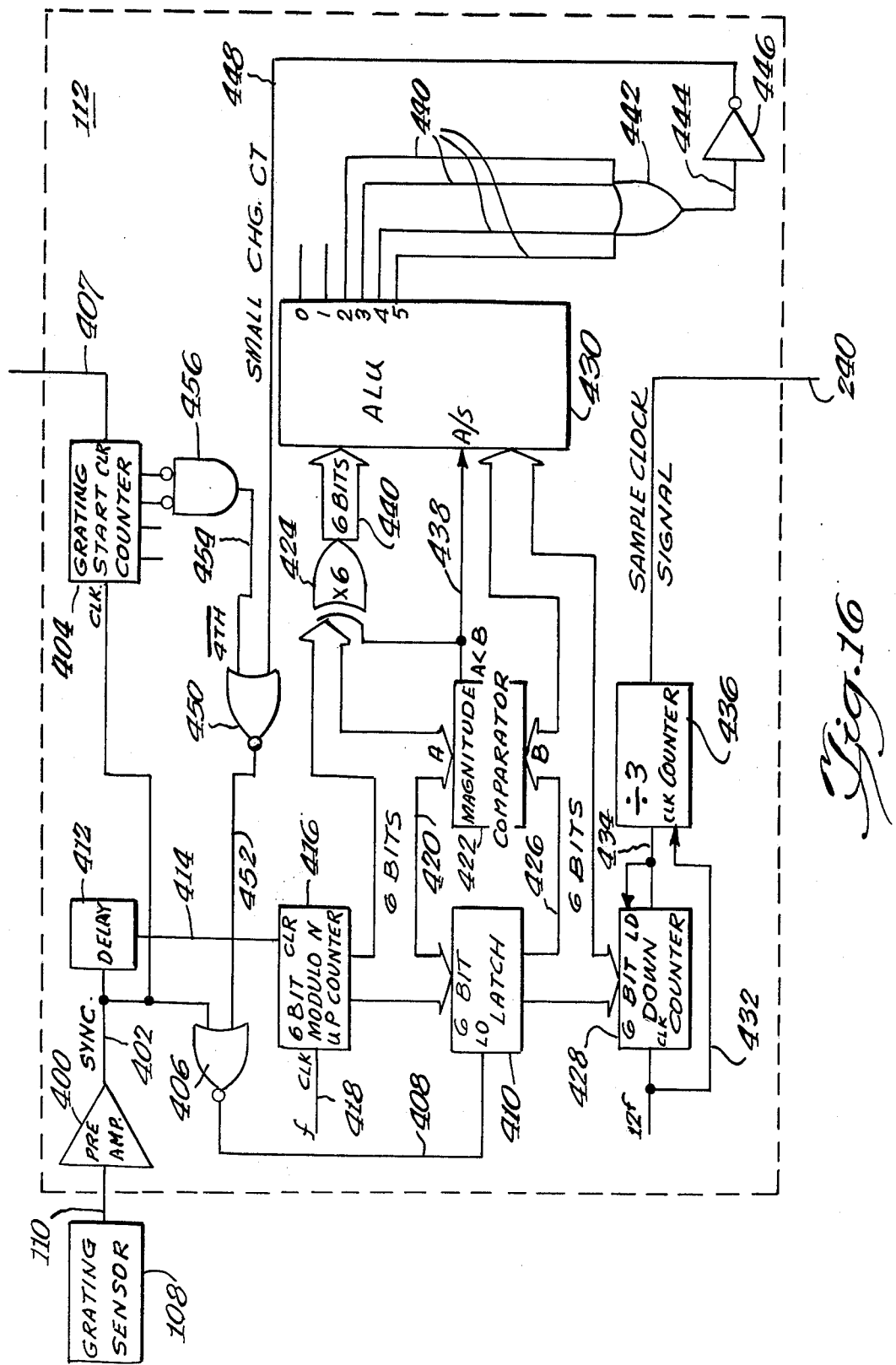
FIG. 16 is a more detailed block diagram of the sample clock generator illustrated in FIG. 10.

Turning to FIG. 16, grating sensor 108 provides the grating pulse or sync signal on lead 110 to preamp 400 of sample clock generator 112. The sync signal output by preamp 400 on lead 402 is applied to grating start counter 404 and NOR 406. Counter 404 is cleared at the beginning of each scan line by a signal on lead 407 from controller 48. The output of NOR 406 is applied by way of lead 408 to the load input of 6 bit latch 410. The sync signal on lead 402 also is applied to a delay 412 the output of which is applied by way of lead 414 to a six bit modulo n up counter 416. Modulo n counter 416 is clocked at a fixed frequency f on lead 418 which in the preferred embodiment is about 817 kHz. Counter 416 is cleared to zero each time a sync pulse is received on lead 110 and the fixed frequency f is chosen such that the nominal count of the modulo n counter will be about 24.

The frequency of the f clock and the 12f clock are chosen so that with a nominal scanning frequency of 20 scan lines per second, counter 416 counts from zero to 23 between most sync pulses and at each sync pulse the counter is cleared to zero and begins counting up again. Because counter 416 is a siz bit counter it has a maximum modulo or a count length of 64. As the galvanometer mirror 90 scans the beam of light 104 across the grating of sensor 102, the modulo n counter which counts the number of f clocks between grating pulses may have different modulos depending upon the speed in which the beam moves across the grating at each line. The speed variation occurs because of the rotational inertia of the mirror, an imperfect drive voltage applied to the galvanometer driver 92 and the non-linear relationship between the galvanometer mirror 90 angular speed and the linear speed of the spot across the grating.

The output of modulo n counter 416 appears on leads 420 and is applied to six bit latch 410, magnitude comparator 422 and six Exclusive OR gates schematically represented by the one Exclusive OR gate 424.

Shortly before clearing the modulo n counter 416 the sync pulse latches the count of counter 416 in latch 410 by way of NOR gate 406 and lead 408. The output of latch 410 appears on leads 426 which are presented to six bit down counter 428, magnitude comparator 422 and arithmatic logic unit 430.

Six bit down counter 428 is a free running counter which is clocked at a frequency which is 12 times greater than the f clock driving the modulo n counter, or 12f. The 12f clock is supplied thereto on lead 432 and is about 9.8 MFz. Down counter 428 thus has the same modulo count as the modulo n counter 416 but is counting down to zero and reloading 12 times faster than the modulo n counter 416. The output of down counter 428 appears on lead 434 which is used to both load the divide by three counter 436 and to reload the down counter 428. Divide by three counter 436 reduces the down counter 428 output by a factor of three from twelve times the modulo n counter frequency to only four times the modulo n counter frequency. Thus the output of the divide by three counter 436 provides four complete cycles or output signals on the lead 240 for every one sync signal applied on lead 110 and provides the desired sample clock signal.

Although counter 428 provides a multiply by 12 and circuit 436 provides a divide by 3 to obtain the desired times 4 sample clock signal, a single circuit providing a simple multiply by 4 could have been used but with some decrease in the resolution of the sample clock signal timing obtained.

Magnitude comparator 422 is continuously comparing the output of latch 410 with the output of modulo n counter 416 and forming an output in response thereto on lead 438. If the output of the latch 410, represented at the magnitude comparator 422 with the letter "B" is greater than the output of the modulo n counter 416 represented at the magnitude comparator 422 with the letter "A", then the signal output on lead 438 will be a logic 1 which is applied to both the six Exclusive OR gates 424 and the arithmatic logic unit 430. Such a logic 1 will invert the logical sense of the output of the modulo n counter 416 through the Exclusive OR gates 424 and the outputs thereof will be applied to the arithmatic logic unit 430 on leads 440. Such a logic 1 signal also will shift the arithmatic logic unit into an add mode and the arithmatic logic unit will add together the signals from the latch 410 and the inverted signals from counter 416.

If the value of the numbers in latch 410 is less than the value of the number in counter 416, then the output on lead 438 from magnitude comparator 422 will be a logical 0, there will be no inversion through Exclusive OR gates 424, and the arithmatic logic unit will subtract the value of the number in the latch from the value of the number in the modulo n counter. Thus subtraction occurs essentially according to the following formula:

Output = |A| − |B|

If the output of the arithmatic logic unit 430 is greater than three, indicating a change of greater than three in the count of the modulo n counter between sync signals, then at least one of the four output leads 440 representing the four most significant bits (MSB) will be a logic 1 and in turn a logic 1 will be output by OR gate 442 on lead 444. The signal on lead 444 is inverted by inverter 446, is carried by lead 448 to NOR gate 450 and by lead 452 to NOR gate 406. Thus a logic 1 on any of leads 440 produces a logic 1 on lead 444 and a logic 0 on lead 448. If grating start counter 404 produces a logical zero on lead 454 through gate 456, the signal on lead 452 will be a logic 1 which will disable NOR gate 406 and prevent a sync pulse from reloading latch 410 with the count contained in modulo n counter 416.

If the signal on lead 454 from grating start counter 404 is a logic 1 however, indicating that a new line has started and that the fourth grating line pair has been reached by the reference beam 104, then the output of OR gate 450 will be a logic 0 which will enable NOR gate 406 and latching of latch 410 by way of sync signal.

If the output of the arithmatic logic unit 430 is such that the change in count is less than three then all of leads 440 will be logic 0's, the output of OR gate 442 will be a logic 0, the output of inverter 446 will be a logic 1 and the output of gate 450 will be a logic 0 enabling the loading of latch 410 by way of sync signal.

The inertia of the galvanometer mirror 90 as it sweeps across the scan line is such that only small speed changes occur from one grating or sync pulse to the next. This keeps the modulo n changes small. A plus or minus three count maximum change at a worse case modulo of 16 corresponds to a ±20% error in a sample position location between sync pulses. While this is the maximum allowed by the circuit described herein, in actual operation a modulo count change greater than unity from one modulo operation to the next will be rare.

Under normal operating conditions, the galvanometer mirror will cause modulo n counts of approximately 24 resulting in only a ±4.2% sample position uncertainity between sample positions and with a ±13% cummulative maximum error for the third sample position following a grating or sync pulse. For systems requiring greater sample position accuracy one may easily limit the galvanometer variation so that the modulo of the counter stays near the high end of the available count or increase the number of bits in the modulo n counter, the latch and the down counter.

The insertion of sample clock pulses between grating pulses will continue even if pulses from the grating are temporarily lost such as which happens if a spec of dust covers one or more grating lines. This occurs because the latch 410 retains the last valid count from the modulo n counter. If the output value of the arithmatic logic unit 430 is greater than three the latch 410 will not be updated with the new modulo n count. An example of this would be where a spec of dust or other material covered up several grating lines, and in the direction that the beam passes across the grating partially covers a clear space. The count of the modulo n counter 416 then would be greater than three counts away from the previously latched value and the latch 410 would not be updated. When the spec of dust was passed and correct count was determined, that is to say the count of the modulo n counter was within three of the latched count, latch 410 then would be updated to allow a different count length for the down counter 428.

Other electronics may be provided in the flat bed scanner system to compensate for changes in the optical path and otherwise.

ELECTRO-MECHANICAL SYSTEM

The flat bed scanner system includes an electro-mechanical system which is used to initialize the light source with the optical path before a scanning cycle, and is used during a scanning cycle to provide desired scan line stepping, to maintain the optical path on focus on the original image from scan line to scan line, and to keep the optical path in focus on the grating.

As has been illustrated in FIGS. 2 and 3, these four functions, light source initialization, scan line step compensation, line to line focus compensation and grating focus compensation are under the control of central controller 48 through several stepping motors. The mechanical connection between the stepping motors and the elements which they drive may be of any type desired, and in particular the mechanical connection 134 between the stepping motor 130 for the raster mirror 124 may be a lead screw/nut combination.

The electrical connection from the controller 48 to the various stepping motors may be as desired, and in the preferred embodiment is an input and output port connected to the data bus of a microprocessor controller such as an Intel 8085 system. Output from the central controller 48 is in the form of binary coded decimal numbers to a stepper motor driver circuit, which applies the proper number of driving pulses to the stepping motor to drive the element connected thereto the desired number of steps. The stepper motor driver circuit provides feedback to the controller 48 when the stepping motor has completed its travel and to this end or in addition thereto the feedback to the controller includes travel limit signals and failure limit signals generated by limit switches and also includes signals from photodetectors, which sense the position of the driven elements. The photodetectors are used in addition to the switches to provide a more accurate positioning of the driven elements than may be obtained from the limit switches. Of course, control of the stepping motors may be by way of hard wired circuitry as is desired, the trade off between microprocessor or hard wire control of the stepping motors being determined by the available time between scan lines in which to perform the stepping functions.

LIGHT SOURCE INITIALIZATION

Light source initialization occurs during a power up sequence of the flat bed scanner system, or may occur in an initialization cycle before a scanning cycle commences. The function of the light source initialization is to place the brightest part of the arc of the Xenon lamp in alignment with the center line of the optical path. The arc of the Xenon lamp is essentially a point source which may vary from location to location within the lamp when the lamp is ignited. In order to maximize the amount of radiant energy available with which to scan the original image, the lamp must be adjusted in vertical directions to align the lamp arc with the desired optical path.

The alignment is performed under control of central controller 48 by the way of lead 56 to stepping motor 54 and therefrom to lamp source 52. Feedback to determine when the brightest or most intense part of the lamp arc is aligned with the optical path is through reference sensor 86 and lead 88 back to central controller 48.

Movement of the Xenon lamp may occur in a predetermined pattern with the intensity of the radiant energy sensed at reference sensor 86 being recorded across the entire predetermined pattern. Thereafter the lamp source 52 is driven to the position which will provide the maximum amount of radiant energy to the optical path, the central controller 48 having stored all of the intensities occurring at positions across the predetermined pattern and selecting the position having the greatest intensity. Alternatively, of course, the controller may move the lamp source 52 in a predetermined pattern and terminate movement thereof when the maximum amount of radiant energy from the lamp is sensed.

SCAN LINE STEP COMPENSATION

It will be remembered that scanning of the original image occurs in scan lines which are spaced equal distance from one another with scanning occurring in each scan line at a rapid rate. It further will be remembered that scanning in each individual scan line is controlled by a fast moving galvanometer mirror 90, while stepping of the scanning beam from scan line to scan line occurs under control of a slow moving raster mirror 124.

It will be appreciated that the angle at which the raster mirror 124 has to be rotated between scan lines occurring at the center of the original image is of a different magnitude than the angle at which the raster mirror has to be rotated to obtain equidistant scan lines at the edges of the original image. Thus to move the beam of radiant energy 34 between scan lines at the outer edge and at the center of the original image, raster mirror 124 has to be rotated with different changes in angles. Further because the original image is sandwiched between glass plates 126 and 150, other factors such as refraction of the light beam 34 through the glass plates must be taken into account to provide the equidistant scan lines. In other words, the raster mirror 124 is rotated at certain angles between scan lines, but the angular change between scan lines occurring at the outer edges of the original are different than the angular changes occurring between scan lines at the center of the original image. It is this change of angular rotation between scan lines which must be compensated for.

Figure 18:
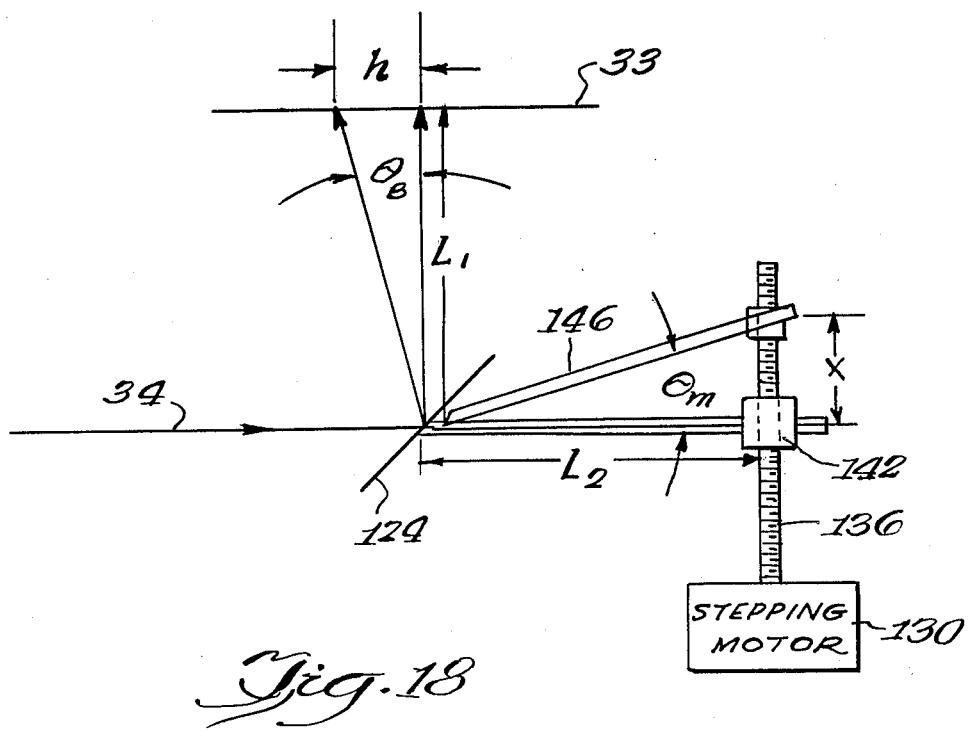
FIG. 18 is a diagram illustrating the geometric relationship of the distances between scan line and steps of the raster mirror stepping motor.

Disregarding optical distortions, the geometries of the beam angle $\theta_B$ and the motor or mirror angle $\theta_M$ are illustrated in FIG. 18 and the equations for beam position as a function of lead screw position are:

$$h = L_1 \tan \theta_B$$

$$x = L_2 \tan \theta_M$$

where:

h is the distance from the center scan line to another scan line on the image plane, x is the distance off center of the motor arm lever 146, $L_1$ is the normal distance from the original image 33 to the raster mirror, and $L_2$ is the normal distance from the raster mirror to the lead screw.

The beam angle is twice the motor angle, that is to say, $\theta_B = 2_M$, and the relationship between distances at the image plane and distance moved by the motor 130 is:

$$x = L_2 \tan^{-1} \tfrac{1}{2} \tan h/L_1.$$

When scanning, it is desirable to move the scanning spot equal increments at the image plane between scan lines. However, this movement is described by the preceding equation which cannot be solved rapidly. In fact, because of the optical distortions present in the preferred embodiment at the glass cover plate 126 at the image plane, the equation relating beam position to beam angle is:

$$h = 199.177 \tan \theta_B - 0.0001 \, \theta_B 2,$$

where $\theta_B$ is the beam angle. Thus, an explicit relationship between the motor movement and beam position cannot be determined except by numerical methods.

In the preferred embodiment raster mirror 124 is rotated by stepping motor 130 through a lead screw/nut connection 136, 142. Thus by applying driving pulses to stepping motor 130, the angular position of stepping motor 124 is accurately controlled. Controller 48 is provided with a memory look up table which contains the information to provide a predetermined scanning pattern for stepping the beam 34 from scan line to scan line. Calculation of the actual number of steps of stepping motor 130 between scan lines may accurately be determined by computation, but produces values for the several steps which are not integers or whole numbers. To reduce the required storage of this data and because the stepping motor may only move an integer number of steps, approximations of the number of steps between scan lines are made with the actual calculated values being rounded off to the nearest whole number and an additional step of the stepping motor being added as needed to correct for inaccuracies in the approximations.

For angles close to zero, that is, normal to the image plane, then $\tan \theta = 0$, and:

$$x = L_2 \tfrac{1}{2} h/h_1.$$

or $$x = L_2/2L_1h \text{ for } \theta_B = 0$$

In the preferred embodiment of the scanner, the lead screw pitch is 1.27 mm. The stepping motor has 2000 steps/revolution. Thus, the linear distance per step is:

$$2000/1.27 = 0.000635 \text{ mm}.$$

Since $L_1 = L_2$, and it is desirable to have the number of motor steps near zero be an integer value, then if $L = 0.01$ millimeters (10 microns), one step at 10 micron resolution, then $$x = \tfrac{1}{2}(0.01), \text{ or } x = 0.005 \text{ mm}$$

Since a single step is 0.000635 mm, a single scan line is $0.005/0.000635 = 7.874$ steps/scan line.

However, the stepping motor can only move an integer number of steps, so an adjustment of the ratio of $L_2 L_1$ will produce a value of 8 steps/scan line (at the center of the format). This makes the storage of the data considerably more compact.

$$8 = (0.000635) = (1)/(2)L_2/L_1(0.01), L_2/L_1 = 1.016,$$

$$L_2 = 199.177 \times 1.016 = 202.363$$

For the lower resolution case of 25 microns distance between scan lines, 20 steps are used per scan line at the center of the format.

Because the values of the numbers provided to stepping motor to step through the scan lines changes relatively slowly over the format of the original image, a compact method of storing the data is to store it as an array of the number of scan lines that the same number of motor steps are repeated. For example, the following table shows the first ten and last ten entries in such an array for a 25 micron sample size.

| SCAN LINES | NUMBER OF STEPPING MOTOR STEPS |
|---|---|
| FIRST 10 ENTRIES | |
| 1 | 18 (SCAN LINE 0 and 6,000) |
| 2 | 19 |
| 1 | 18 |
| 2 | 19 |
| 1 | 18 |
| 1 | 19 |
| 1 | 18 |
| 2 | 19 |
| 1 | 18 |
| 1 | 19 |
| LAST 10 ENTRIES | |
| 1 | 19 |
| 26 | 20 |
| 1 | 19 |
| 36 | 20 |
| 1 | 19 |
| 49 | 20 |
| 1 | 19 |
| 80 | 20 |
| 1 | 19 |
| 205 | 20 (SCAN LINE 3,000) |

As may be seen, the number of scan lines from which the same number of motor steps is repeated is small near the edges, scan lines 0 and 6,000 of the original image and are large at the center, scan line 3,000. Further it will be noted that the table entries may be read from the beginning to the end and back again as the distances between scan lines are mirror images of each other on opposite side of the center of the original image.

Thus after having been initialized to an edge of the original image, scan line 0, the stepping motor is moved once by 18 steps. For the next two scan lines, the stepping motor is moved 19 steps for each scan line. For the next single scan line, the stepping motor is moved 18 steps and so forth until the last 205 scan lines before the center of the original image. The stepping motor is moved 20 steps between scan lines. It should be remembered that the stepping motor 130 is advanced only during the period of time in which the galvanometer mirror 90 is being returned to its home position; the stepping mirror 130 and for that matter all other stepping motors being at rest during the scanning of an individual scan line.

The last 10 entries for the data table for the 10 micron case are as follows:

| LAST 10 ENTRIES | |
|---|---|
| SCAN LINES | NUMBER OF STEPPING MOTOR STEPS |
| 1 | 1 |
| 1 | 1 |
| 1 | 7 |
| 76 | 8 |
| 1 | 7 |
| 93 | 8 |
| 1 | 7 |
| 122 | 8 |
| 1 | 7 |
| 202 | 8 |
| 1 | 7 |
| 512 | 8 (SCAN LINE 3,000) |

Thus, the last 512 scan lines use 8 motor steps between the scan lines, while the previous scan line will use 7 steps, the previous 202 steps will use 8 steps, etc.

LINE TO LINE FOCUS COMPENSATION

It has been explained how the prime scanning lens 98 maintains beam 34 in focus on the imaging plane across one scan line. The purpose of the line to line focus compensation function is to maintain beam 34 in focus i.e. to form a focused image from scan line to scan line.

The formula which relates the object distance from a focusing element to the image distance from the focusing element is as follows:

$$1/f = 1/s_1 + 1/s_2$$

where f is the focal length of the focusing element;

$s_1$ is the object distance from the focusing element; and $s_2$ is the image distance from the focusing element.

Figure 17:
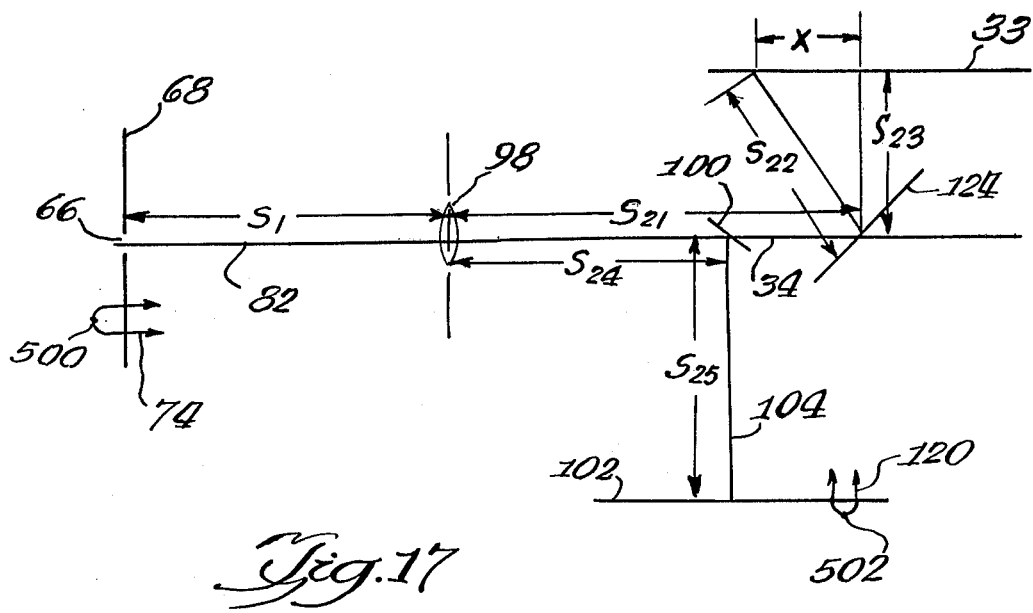
FIG. 17 is a line diagram illustrating the object and image distances of the optical system.

Referring to FIG. 17, the problem which occurs in this flat bed scanning system and which is overcome by the invention herein is diagrammatically illustrated. The distance $s_1$ is the distance between aperture plate 68 containing pinhole 66 and prime scanning lens 98 and the distance $s_1$ being the distance along which beam 82 travels.

The distance $s_2$ however changes from scan line to scan line. The distance $s_2$ for scan lines occurring at the edge of original image 33, is equal to the distance $s_{21}$ from prime scanning lens 98 to the center of raster mirror 124 plus the distance $s_{22}$ from raster scanning mirror 124 to original image 33, the scanning lines at the edge of the original image 33 being at some distance x from the center of the original image. When scanning of the original image occurs at the center thereof the distance $s_2$ is equal to $s_{21}$ plus $s_{23}$. It may clearly been seen in FIG. 17 that the distance $s_{23}$ is less than the distance $s_{22}$, the distance $s_{22}$ forming the hypotenuse of a right triangle having legs represented by the distance x along the original image and the distance $s_{23}$ perpendicular to the original image 33. Thus in order to maintain for different scan lines the relationship between the distances $s_1$ and $s_2$ for a given focal length of prime scanning lens 98, which focal length is fixed, $s_1$ must be changed.

Changing of the distance $s_1$ is performed by way of stepping motor 72 which is shown in FIG. 2 as driving both decollimating lens 64 and aperture plate 68. Movement of aperture plate 68 occurs in the direction indicated by arrow 74 with the scan lines occurring at the edges of original image 33 corresponding to the positions indicated by the arrowheads of arrow 74 and the scan line occurring at the center of original image 33 corresponding to the point 500 located on arrow 74 in FIG. 17.

As is illustrated in FIG. 2, control of stepping motor 76 is by way of central controller 48 which moves aperture plate 68 the desired distances to keep beam 34 in focus on the imaging plane in conjunction with the stepping from scan line to scan line discussed hereinbefore. This is by way of a look up table contained in the memory of central controller 48.

The look up table memory need only contain values for moving aperture 68 from the edge scan lines to the center scan lines and back again because the scanning patterns on either side of the center scan line are mirror images of each other. Further, the predetermined values indicate the number of scan lines which are scanned between single steps of the stepping motor 72 and in this regard, the table for the line to line focus compensation differs from the table for scan line step compensation.

GRATING FOCUS COMPENSATION

In conjunction with the line to line focus compensation function of the flat bed scanner system, a grating focus compensation function also must be performed to maintain beam 14 focus on the grating 102 during the scanning of each scan line. Again the formula:

$$1/f = 1/s_1 + 1/s_g$$

where $s_g$ is the image distance to the grating, applies to maintaining beam 104 in focus on grating 102. In this particular case $s_1$ still refers to the object distance between aperture plate 68 and the prime scanning lens 98 while $s_g$ now refers to the image distance $s_{24}$ from prime scanning lens 98 to beam splitter 100 plus the distance $s_{25}$ from beam splitter 100 to grating 102.

Thus when the distance $s_1$ is moved to provide for the line to line focus compensation, the distance $s_{25}$ must also be changed accordingly so that beam 104 will be focused as a spot or focused image on grating 102 and in turn so that sampling of original image 33 will occur at the proper sample positions. As is illustrated in FIG. 3, stepping motor 118 is provided to move position grating 102 in the directions indicated by arrow 120 under control of central controller 48 by way of lead 122. In the preferred embodiment, the arrowheads of arrow 120 correspond to scan lines occurring at the outer edges of original image 33 while the point 502 on arrow 120 in FIG. 17 corresponds to the scan line occurring at the center of the original image 33.

Control of stepping motor 118 by central controller 48 is by way of a look up table or otherwise as is desired with the movement of grating 102 occurring between scan lines while the galvanometer mirror 90 is being returned to its home position so that the movement of grating 102 will be settled down during the scanning of a scan line. Movement of the grating occurs simultaneous with movement of the aperture plate while movement of the grating and aperture plate occurs in conjunction with the stepping from scan line to scan line.

Other stepping motors are provided in the flat bed scanner system. For example to select between the 25 micron and 10 micron sample positions, aperture 68 is provided with two pinholes 66 one having a ten micron diameter and the other having a 25 micron diameter and there being a stepping motor provided to rotate aperture plate 68 to and from the desired pinhole.

To provide the proper grating for the 25 and 10 micron sample sizes, a separate grating is provided for each case with a stepping motor under control of controller 48 to insert the desired grating into the optical path defined by beam 104.

A stepping motor is provided to advance the film carrier tray from the flat bed scanner system cabinetry onto which the original image may be manually loaded and then retracted by way of the stepping motor.

Further calibration filters may be inserted into the optical path such as between collimating lens 58 and decollimating lens 64 to aid in the diagnostics of and the setting up of the color channel and reference channel electronics. These calibrations filters would be rotated into position under control of central controller 48 by way of a stepping motor and rotated out of the optical path when the diagnostics or calibration of the electronics was completed.

The optical scanning system in the preferred embodiment is contained in two cabinets, one containing essentially the optical path and sensors illustrated in FIGS. 2, 3 and 4 with the electronics and central controller being located in a separate but adjacent cabinet.

The output of the color channel electronics may be buffered as desired and in the preferred embodiment two full scan lines of data are contained in buffer 226. In the preferred embodiment the output from the flat bed scanner system is used in a computerized graphics and text compulation system to produce printing plates for use on a lithographic offset printing presses, the output of the flat bed scanner system being used primarily to provide the graphics information therefore.

Modifications and variations of the present invention are possible in light of the above teachings. It is, therefore, to be understood that within the scope of the appended claims the invention may be practiced otherwise than as specifically described.

What is claimed and desired to be secured by Letters Patent of the United States is:

1. For use in an optical scanning system where a beam of light is deflected across a planar original image in a pattern of scan lines by a rotatable raster mirror having a center of rotation at a fixed distance perpendicular from the original image and arranged parallel to the scan lines, an apparatus for compensating for the differences in rotational changes of the raster mirror required to produce equidistant scan lines on the original image, the apparatus comprising:

stepping motor means for rotating, in response to stepping pulse applied thereto, the raster mirror in incremental angular steps that are much smaller than the angular change requied to deflect the beam of light from scan line to scan line;

memory means containing a plurality of fixed numbers representing the number of stepping pulses to be applied to the stepping motor to rotate the raster mirror the required number of incremental angular steps to step the beam of light from scan line to scan line; and controller means for applying stepping pulses to the stepping motor in response to the fixed numbers contained in the memory means to rotate the raster mirror and deflect the beam from scan line to scan line, said controller means comprising means for selecting different fixed numbers corresponding to different locations of the scan line on the original image, whereby said stepping motor is stepped a different predetermined number of steps corresponding to said plurality of fixed numbers.

2. The apparatus as claimed in claim 1 in which the memory means include first and second fixed numbers corresponding to each other, the first fixed number being the number of incremental steps by which the raster mirror is to be rotated for each of the second fixed number of scan lines.

3. The apparatus as claimed in claim 2 in which the first and second fixed numbers are the same for scan lines that are on opposite sides of and equal distances from the scan line at the center of the original image.

4. For use in an optical system where a beam of light is deflected across a planar original image in a pattern of scan lines by a rotatable raster mirror having a center of rotation at a fixed distance perpendicular from the center of the original image and arranged parallel to the scan lines, a method for compensating for the differences in rotational changes of the raster mirror required to produce equidistant scan lines on the original image, the method comprising:

moving the raster mirror to a starting position such that the beam of light is deflected by the raster mirror onto a scan line lying along one edge of the original image;

rotationg the raster mirror in incremental angular steps to deflect the beam from scan line to scan line, the incremental angular steps being smaller than the angular change of the raster mirror from scan line to scan line, and the number of steps by which the raster mirror is rotated between scan lines being a function of the position of the scan line in the scanning pattern; and selecting a different fixed number of steps corresponding to different locations of the scan line on the original image.

5. A method as claimed in claim 4 in which rotating the raster mirror in incremental angular steps includes reading first and second fixed numbers corresponding to each other, the first fixed number being the number of incremental steps by which the raster mirror is to be rotated for each of the second fixed number of scan lines, and further including stepping the raster mirror the first fixed number of steps for each second fixed number of scan lines, and repeating the method steps of reading and stepping until the scanning pattern is completed.

6. The method as claimed in claim 5 in which the fixed numbers are the same for scan lines which are on opposite sides of and equal distances from the scan line at the center of the original image.

7. An apparatus for compensating for changes in the image distance $S_2$ along an optical path in a flat-bed scanner system in which a planar original image to be scanned is fixed, a focused image of a beam of light is deflected in the plane of the original image and across the original image in a pattern of sequential scan lines, there being a raster mirror which is stepped to deflect the focused image from scan line to scan line, the raster mirror being rotated around a rotational axis which is a fixed distance from the original image, there being an aperture plate movable along the optical path and having a pinhole forming the object of the focused image and there being a prime scanning lens along the optical path between the pinhole and the original image for forming the focused image, the image distance $S_2$ being the distance from the prime scanning lens to the scan lines and the object distance $S_1$ being the distance from the pinhole to the prime scanning lens, the prime scanning lens being fixed along the optical path and having a fixed focal length f and the image distance varying as the raster mirror deflects the beam from scan line to scan line, the apparatus comprising:

stepping motor means for moving the aperture plate in incremental linear steps along the optical path in response to stepping pulses applied thereto;

memory means containing a plurality of fixed numbers representing the number of scan lines by which the aperture plate must be moved one step to maintain the focused image in the plane for every scan line; and controller means for applying stepping pulses to the stepping motor in response to the fixed numbers contained in the memory and applying the stepping pulses to the stepping motor means in conjunction with the stepping of the raster mirror to maintain the focused image in the plane for every scan line, said controller means comprising means for selecting different fixed numbers corresponding to different locations of the scan line on the original image, whereby said stepping motor is stepped a different predetermined number of steps corresponding to said plurality of fixed numbers.

8. A method of compensating for changes in the image distance $S_2$ along an optical path in a flat bed scanner system in which a planar original image to be scanned is fixed, a focused image of a beam of light is deflected across the original image in a pattern of sequential scan lines, there being a raster mirror which is stepped to deflect the focused image from scan line to scan line, the raster mirror being rotated around a rotational axis which is a fixed distance from the original image, there being an aperture plate along the optical path having a pinhole forming the object of the focused image and there being a prime scanning lens along the optical path between the pinhole and the original image for forming the focused image, the image distance $S_2$ being the distance from the prime scanning lens to the scan lines and the object distance $S_1$ being a distance from the pinhole to the prime scanning lens, the prime scanning lens being fixed along the optical path and having a fixed focal length f, and the image distance varying as the raster mirror deflects the beam from scan line to scan line, the method comprising:

providing movement for the aperture plate along the optical path; and moving the aperture plate in incremental linear steps along the optical path in conjunction with the raster mirror stepping to deflect the beam of light from scan line to scan line on the original image, the distances the aperture plate is moved being such as to maintain the focused image in the plane of the original image for every scan line.

9. The method as claimed in claim 8 in which moving the aperture plate in incremental linear steps includes reading a fixed number that indicates the number of scan lines by which the aperture plate is to be moved one step, and includes stepping the aperture plate one step for every fixed number of scan lines.

10. An apparatus for compensating for changes in the image distance $S_g$ to a grating along an optical path in a flat bed scanner system in which a planar original image to be scanned is fixed, a focused image of a sensing beam of light is deflected across the plane of the original image in a pattern of sequential scan lines to scan the original image, a focused image of a reference beam of light split from the sensing beam is deflected across the plane of a planar grating for every scan line, there being an aperture plate movable along the optical path and having a pinhole forming the object of the focused images and there being a prime scanning lens along the optical path between the pinhole and the original image and grating for forming the focused images, the image distance $S_g$ being the distance from the prime scanning lens to the grating and the object distance $S_2$ being the distance from the pinhole to the prime scanning lens, the prime scanning lens being fixed along the optical path and having a focal length f, and the distance $S_2$ being varied from scan line to scan line to maintain the focused image of the sensing beam in the plane of the original image for every scan line, the apparatus comprising:

a stepping motor for moving, in response to stepping pulses applied thereto, the grating in incremental linear steps along the optical path;

memory means containing fixed numbers representing the number of scan lines by which the grating is moved one step along the optical path to maintain the focused image of the reference beam on the grating for every scan line, and controller means for applying stepping pulses to the stepping motor in response to the fixed numbers contained in the memory means and applying the stepping pulses to the stepping motor means in conjunction with the movement of the aperture plate along the optical path to maintain the focused image of the reference beam on the plane of the grating for every scan line.

11. A method of compensating for changes in the image distance $S_g$ to a grating along an optical path in a flat bed scanner system in which a planar original image to be scanned is fixed, a focused image of a sensing beam of light is deflected across the plane of the original image in a pattern of sequential scan lines to scan the original image, a focused image of a reference beam of light split from the sensing beam is deflected across the plane of a planar grating for every scan line, there being a movable aperture plate along the optical path having a pinhole forming the object of the focused images and there being a prime scanning lens along the optical path between the pinhole and the original image and grating for forming the focused images, the image distances $S_g$ being the distance from the prime scanning lens to the grating and the object distance $S_2$ being a distance from the pinhole to the prime scanning lens, the prime scanning lens being fixed along the optical path and having a focal length f and the distance $S_2$ being varied from scan line to scan line by moving the aperture plate along the optical path to maintain the focused image of the sensing beam in the plane of the original image for every scan line, the method comprising:

providing for the movement of the grating along the optical path; and moving the grating in incremental linear steps along the optical path in conjunction with the aperture plate being moved along the optical path, the distances being moved by the grating being such as to maintain the focused image of the reference beam on the plane of the grating for every scan line.

12. The method as claimed in claim 11 in which moving the grating in incremental linear steps includes reading a fixed number that indicates the number of scan lines by which the grating is to be moved one step, and includes stepping the grating one step for every fixed number of scan lines.

13. An apparatus for maintaining a focused sensing image in the plane of a planar original image and for maintaining a focused reference image in the plane of a planar grating along optical paths of a flat bed scanner system in which a planar original image to be scanned is fixed, the focused sensing image of a beam of light is deflected across the original image in a pattern of sequential scan lines, the focused reference image of the beam is deflected across the grating for every scan line, there being an aperture plate along the optical path having a pinhole forming the object of the focused images and there being a prime scanning lens along the optical path between the pinhole and the original image and grating for forming the focused images, there being a sensing image distance $S_1$ from the prime scanning lens to the scan lines on the original image, there being a reference image distance $S_g$ from the prime scanning lens to the grating and there being an object distance $S_2$ from the pinhole to the prime scanning lens, the prime scanning lens being fixed along the optical path and having a fixed focal length f, the image distances $S_1$ and $S_g$ being equal, and the distance $S_2$ varying as the focused sensing image is stepped from scan line to scan line, the apparatus comprising:

aperture stepping motor means for moving the aperture plate along the optical path in incremental linear steps in response to stepping pulses applied thereto;

grating stepping motor means for stepping the grating along the optical path in incremental linear steps in response to stepping pulses applied thereto;

memory means containing fixed numbers representing the number of scan lines by which the aperture plate and grating must be moved one step along the optical path to maintain the focused sensing image in the plane of the original image for every scan line, and the focused reference image in the plane of the grating for every scan line; and controller means for applying stepping pulses to the stepping motors in response to the fixed numbers contained in the memory means to maintain the focused sensing images in the plane of the original image for every scan line and the focused reference image in the plane of the grating for every scan line.

14. A method of maintaining a focused sensing image in the plane of a planar original image and for maintaining a focused reference image in the plane of a planar grating along optical paths of a flat bed scanner system in which a planar original image to be scanned is fixed, the focused sensing image of a beam of light is deflected across the original image in a pattern of sequential scan lines, the focused reference image of the beam is deflected across a grating for every scan line, there being an aperture plate along the optical path having a pinhole forming the object of the focused images and there being a prime scanning lens along the optical path between the pinhole and the original image and the grating for forming the focused images, there being a sensing image distance $S_1$ from the prime scanning lens to the scan lines on the original image, there being a reference image distance $S_g$ from the prime scanning lens to the grating and there being an object distance $S_2$ from the pinhole to the prime scanning lens, the prime scanning lens being fixed along the optical path and having a fixed focal length f, the image distances $S_1$ and $S_g$ being equal and the distance $S_2$ varying as the focused sensing image is stepped from scan line to scan line, the method comprising:

providing movement for the aperture plate along the optical path;

providing movement for the grating along the optical path; and moving the aperture plate and grating in incremental linear steps along the optical path in conjunction with the stepping of the focused sensing image from scan line to scan line on the original image, the distances that the object and the grating are moved by being such as to maintain the focused sensing image in the plane of the original image for every scan line and to maintain the focused reference image in the plane of the grating for every scan line.

15. The apparatus as claimed in claim 14 in which moving the aperture plate and grating includes reading a fixed number that represents the number of scan lines by which the grating is to be moved one step, and includes stepping the aperture plate and grating one step for every fixed number of scan lines.

16. A flat bend scanning system in which an original, planar image is optically scanned in a pattern of sequential scan lines to produce digital data representing the densities of the original image, the system comprising:

A. a source of white light; and

B. optical means for directing at least some of the white light from the source along an optical path and onto the original image, the optical means including:

1. a plate having a pinhole therein the pinhole being aligned with the optical path at a point along the optical path and at least some white light passing therethrough and the pinhole forming an optical object;
2. focusing means for forming said at least some white light into a spot of white light on the original image, the spot being the focused image of the pinhole object and the spot being deflectable across the original image;
3. raster mirror means that are rotatable for deflecting the spot from scan line to scan line, the rotation of the raster mirror means being fixed between scan lines; and
4. galvanometer mirror means that are rotatable for deflecting the spot across every scan line, the galvanometer mirror means being the only moving part of the flat bed scanner system during the deflection of a spot across a scan line.

17. A method of scanning in a flat bed scanning system where an original image is optically scanned in a pattern of sequential scan lines to produce digital data representing the densities of the original image, the method comprising:

providing a source of white light; and directing at last some of the white light from the source along an optical path and onto the original image, the step of directing at least some of the white light including:

providing an optical object along the optical path through which the at least some white light passes;

forming a focused image of the object on the original image, the focused image being deflectable across the original image;

deflecting the focused image from scan line to scan line with a raster mirror, including maintaining the raster mirror fixed between scan lines;

deflecting the focused image across every scan line with a galvanometer mirror, the galvanometer mirror being the only moving part of the flat-bed scanner system during the deflection of the focused image across a scan line; and reading a fixed number that represents the number of scan lines by which the grating is to be moved one step, and stepping the aperture plate and grating one step for every fixed number of scan lines.

* * * * *

UNITED STATES PATENT AND TRADEMARK OFFICE
CERTIFICATE OF CORRECTION

PATENT NO. : 4,424,589
DATED : JANUARY 3, 1984
INVENTOR(S) : Thomas, et al.

It is certified that error appears in the above-identified patent and that said Letters Patent are hereby corrected as shown below:

Column 11, line 29, change "particularly" to --particular--.
Column 13, line 14, change "carrier" to --carried--.
Column 14, line 52, change "L2-L2" to --L2-L3--.
Column 20, line 2, change "an" to --and--.
Column 22, line 39, change "conveter" to --converter--.
Column 31, line 3, change the formula to:

$$X = (L_2/2L_1)h \quad \text{for } \theta_B = 0$$

Column 31, line 26, change the formula to:

$$8 \times (0.000635) = (\tfrac{1}{2}) \frac{L_2}{L_1} (.01), \quad \frac{L_2}{L_1} = 1.016$$

Column 33, line 45, change "14" to --104--.
Column 34, line 33, change "calibrations" to --calibration--.

Signed and Sealed this

Twenty-sixth Day of February 1985

[SEAL]

Attest:

DONALD J. QUIGG

Attesting Officer         Acting Commissioner of Patents and Trademarks